(12) United States Patent
Blohmé et al.

(10) Patent No.: US 9,924,240 B2
(45) Date of Patent: Mar. 20, 2018

(54) SYSTEMS AND METHODS FOR INTERACTIVE VIDEO GENERATION AND RENDERING

(71) Applicant: Google Inc., Mountain View, CA (US)

(72) Inventors: Patrick Ted Gert Blohmé, Los Angeles, CA (US); Christopher Michael Roush, Brooklyn, NY (US); Karl Henrik Olav Porseland, Los Angeles, CA (US); Michael William Tavendale, Los Angeles, CA (US); Mathias Paumgarten, Los Angeles, CA (US); Eric Henry Margusity, Brooklyn, NY (US); Wes Falik, New York, NY (US); Jens Fischer, Brooklyn, NY (US); Simon Frederick Cave, San Francisco, CA (US); Israel Pastrana Vicente, San Francisco, CA (US); Cornelis Antonius Plattel, Amsterdam (NL); Jonathan Patrick Brennan, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/144,787

(22) Filed: May 2, 2016

(65) Prior Publication Data

US 2016/0321832 A1    Nov. 3, 2016

Related U.S. Application Data

(60) Provisional application No. 62/155,921, filed on May 1, 2015.

(51) Int. Cl.
*G06T 13/00* (2011.01)
*H04N 21/858* (2011.01)
(Continued)

(52) U.S. Cl.
CPC ........ *H04N 21/858* (2013.01); *G06F 3/0488* (2013.01); *G06F 3/04842* (2013.01);
(Continued)

(58) Field of Classification Search
CPC .. G06T 13/00; G06T 2213/12; G06T 2213/04
See application file for complete search history.

(56) References Cited

U.S. PATENT DOCUMENTS

| 7,746,343 | B1 | 6/2010 | Charaniya |
| 8,411,931 | B2 | 4/2013 | Zhou |

(Continued)

*Primary Examiner* — Phi Hoang
(74) *Attorney, Agent, or Firm* — Dority & Manning, P.A.

(57) ABSTRACT

A method for animating a map resource is provided, the method includes receiving a plurality of Uniform Resource Locators (URLs) from a third party website, the plurality of URLs comprising one or more attributes; receiving a user selection to create an animation sequence of one or more of the attributes; querying a current value of the one or more attributes from an external resource and returning the queried value; receiving, from the user, a first keyframe and a second keyframe for the animation sequence; interpolating one or more additional keyframes with assigned values; and creating the animation sequence based on the first keyframe, the second keyframe, and the one or more additional keyframes.

19 Claims, 32 Drawing Sheets

(51) Int. Cl.
*G06T 11/60* (2006.01)
*G06F 3/0484* (2013.01)
*G06F 3/0488* (2013.01)
*G06T 13/80* (2011.01)
*H04N 21/845* (2011.01)

(52) U.S. Cl.
CPC .............. *G06T 11/60* (2013.01); *G06T 13/80* (2013.01); *H04N 21/8455* (2013.01)

(56) References Cited

U.S. PATENT DOCUMENTS

| | | |
|---|---|---|
| 8,558,848 B2 | 10/2013 | Meadow |
| 2006/0259870 A1* | 11/2006 | Hewitt .................. G06F 9/4443 715/762 |
| 2013/0050224 A1* | 2/2013 | Gehani .................. G06T 13/80 345/473 |
| 2013/0150124 A1 | 6/2013 | Kim |
| 2013/0222369 A1 | 8/2013 | Huston |
| 2013/0223691 A1 | 8/2013 | Paczkowski |
| 2013/0321400 A1 | 12/2013 | van Os |
| 2013/0326425 A1 | 12/2013 | Forstall |

* cited by examiner

```
{"frames": [
    "1": {"x": 100, "y": 75},
    "2": {"x": 98, "y": 75},
    "3": {"x": 96, "y": 75},
    "4": {"x": 94, "y": 75},
    "5": {"x": 93, "y": 73},
    "6": {"x": 92, "y": 73},
    "7": {"x": 90, "y": 73},
    "8": {"x": 89, "y": 72},
    "9": {"x": 86, "y": 71},
    "10": {"x": 84, "y": 70},
    "11": {"x": 80, "y": 69},
    "12": {"x": 76, "y": 68},
    "13": {"x": 73, "y": 68},
    "14": {"x": 68, "y": 62},
    "15": {"x": 64, "y": 60},
    "16": {"x": 59, "y": 59},
    ...
]}
```

SYSTEMS AND METHODS FOR INTERACTIVE VIDEO GENERATION AND RENDERING

CROSS-REFERENCE TO RELATED APPLICATIONS

The present application claims priority under 35 U.S.C. § 119 to U.S. Provisional Patent Application No. 62/155,921, which was filed in the United States Patent and Trademark Office on May 1, 2015, the entire disclosure of which is incorporated herein by reference.

BACKGROUND

The present invention relates generally to video generation rendering and, more specifically, to systems and methods for interactive video generation and rendering.

Video is an electronic medium for the recording, copying, playback, broadcasting, and displaying of moving visual media. Video may be generated and rendered by various methods. For example, one such method is videography, i.e., capturing live moving images using a video camera, smartphone, or a similar device.

SUMMARY

Moving images may be stored on electronic media such as solid state storage devices, videotape, and/or direct to disk recording. Moving images (e.g., video) may also be temporarily stored in temporary memory such as RAM and then streamed via one or more networks to one or more devices or stored on one or more servers for future access and streaming. Once the video is stored on a medium, combinations of the moving images may be generated and certain images of the video may be altered.

There is a technological problem in videography in that the moving images/video produced by videography may have various technical defects such as blur, motion blur, poor image stabilization, and the like. These and other defects and/or artifacts may be caused by, for example, hardware limitations of the device being used for videography such as inadequate shutter speed, low resolution, inadequate blur correction, and the like. Some artifacts may also be caused by lossy compression or lack of camera stabilization (e.g., shake). Other artifacts may include edge blurring, which may be caused by half-toning processes that are unable to track rapid gray level changes in the continuous-tone image. Still other artifacts may result in visible spatial and temporal artifacts. Still other artifacts include flicker, dirty-window-effect, noise, fixed-pattern noise, distortion, color banding, Moiré pattern, chromatic aberration, purple fringing, rainbow effect, screen tearing, silk screen effect, and the like.

There is another technical problem with videography in that one may not be able to capture objects and/or create moving images/video in desired conditions. For example, if one desires to capture a particular object in a specific weather pattern such as rain, it may not be raining at the time of videography. Similarly, one may desire to capture objects at particular times of day (e.g., dusk, dawn, day, night, 3 p.m., and the like) but it may not be that time of day or time of year at the time of the image/video capturing/videography. Another technical problem is that it may not be technically feasible to travel at a desired velocity, or in a particular course, while performing videography. For example, one may desire to generate/render a series of moving images (e.g., video) capturing a particular geographic area at Mach 15. However, it is currently impossible or prohibitively expensive to travel at that velocity to capture said series of moving images. It may also not be possible to make certain degree turns at certain speeds when using videography.

Embodiments of the present invention solve the above technological problems and provide a technological solution by providing systems and methods for interactive video generation and rendering. The technological solution does not require the use of live subjects or videography. Instead, in the technological solution, the system stores a plurality of images either on the device operated by the user to generate and/or render the video or on a remote server connected to the user device via a network. Each stored image is associated with a plurality of metadata such as latitude, longitude, altitude, pan, time of day, day of year, date, roll, pitch, yaw, weather conditions, and the like. The user may then use a graphical user interface provided by the system to generate an animation sequence (e.g., a video) by combining multiple images.

There is a further technological problem in that, in creating an animation sequence, the user may find it difficult to create a smooth video by manually choosing a set of images/keypoints. In particular, the user may find it desirable to create an animation sequence which has a natural fly-through/move-through feel. The system solves the above problem by providing a technical solution that includes a graphical user interface to the user with the ability to create keypoints such that the resulting animation sequence looks smooth and is easy to create for the user. The system may generate additional keypoints for the user by using various smoothing techniques.

While the invention is described with reference to the above drawings, the drawings are intended to be illustrative, and the invention contemplates other embodiments within the spirit of the invention.

DETAILED DESCRIPTION OF EMBODIMENTS OF THE PRESENT INVENTION

The present invention will now be described more fully hereinafter with reference to the accompanying drawings which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as devices or methods. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrases "in one embodiment," "in an embodiment," and the like, as used herein, does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

It is noted that description herein is not intended as an extensive overview, and as such, concepts may be simplified in the interests of clarity and brevity.

Figure 1:
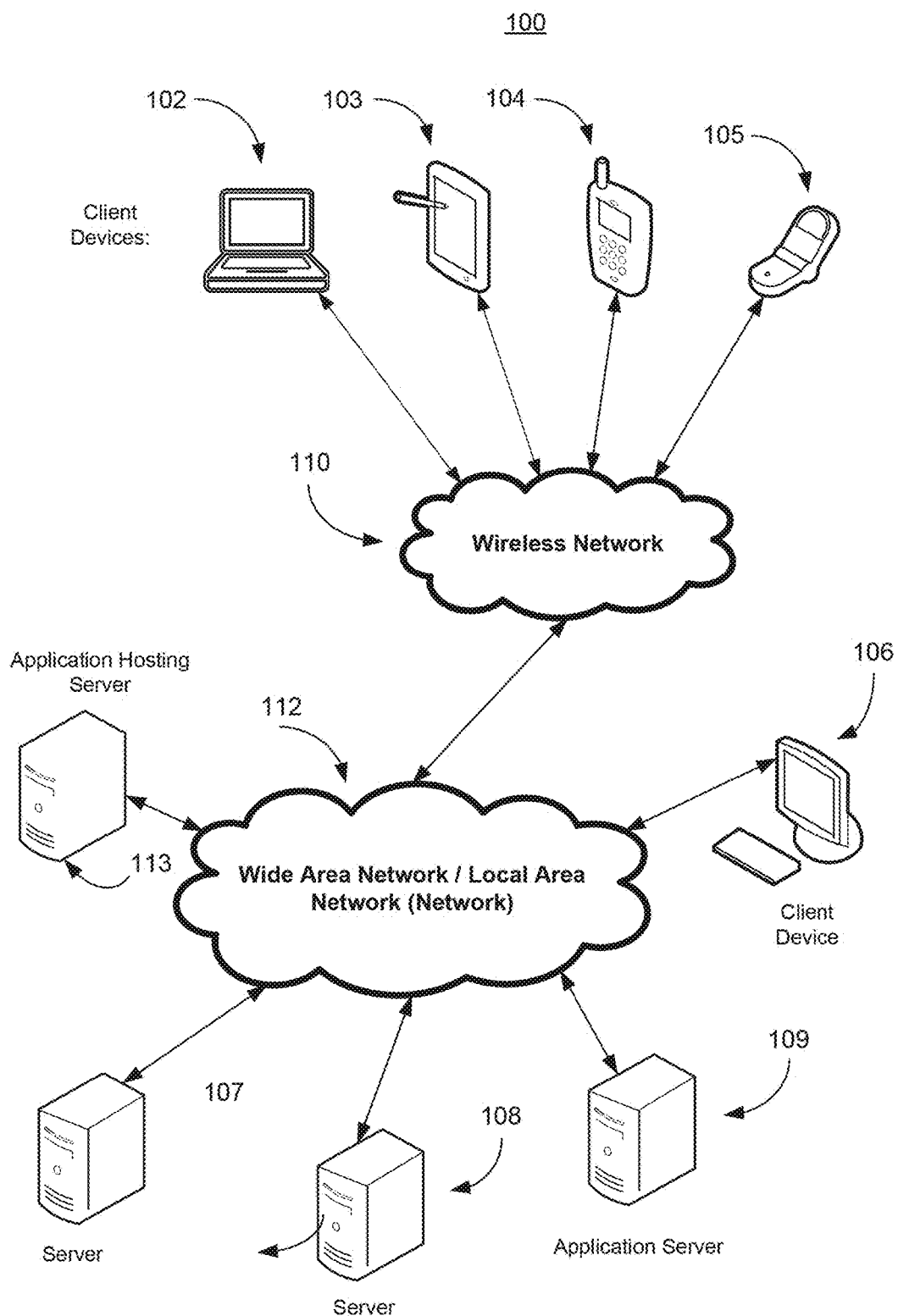
FIG. 1 illustrates a block diagram of a distributed computer system that can implement one or more aspects of systems and methods for interactive video generation and rendering according to one embodiment of the invention.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more Local Area Networks ("LANs")/Wide Area Networks ("WANs") 112, one or more wireless networks 110, one or more wired or wireless client devices 106, mobile or other wireless client devices 102-106, servers 107-108, application server 109, application hosting server 113, and may include or communicate with one or more data stores or databases. Various of the client devices 102-106 may include, for example, desktop computers, laptop computers, set top boxes, tablets, cell phones, smart phones, and the like. The servers 107-109 and 113 can include, for example, one or more application servers, content servers, search servers, and the like.

Figure 2:
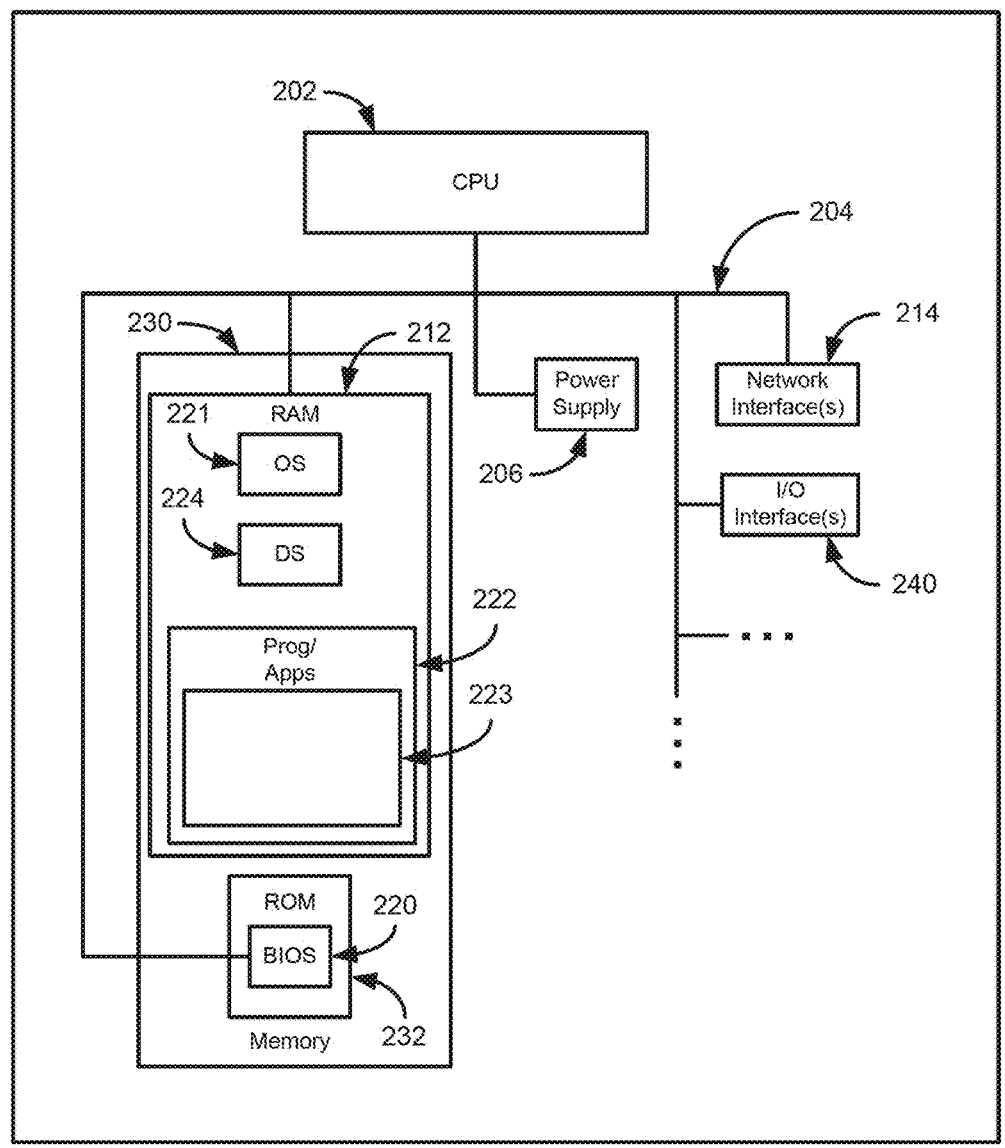
FIG. 2 illustrates a block diagram of an electronic device that can implement one or more aspects of systems and methods for interactive video generation and rendering according to one embodiment of the invention.

FIG. 2 illustrates a block diagram of an electronic device 200 that can implement one or more aspects of systems and methods for interactive video generation and rendering according to one embodiment of the invention. Instances of the electronic device 200 may include servers, e.g., servers 107-109 and 113, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, GPS components, etc., which may be operable, for example, to provide graphical user interfaces.

A user may provide input via a touchscreen of an electronic device 200. A touchscreen may determine whether a user is providing input by, for example, determining whether the user is touching the touchscreen with a part of the user's body such as his or his fingers. A touchscreen may include a resistive touchscreen. A resistive touchscreen includes at least two transparent electronically-resistive layers separated by a thin space. The two layers include a scratch-resistant outer layer and an inner layer which may not be scratch-resistant. The outer layer has a top-side, which the user may make physical contact with and an underside, facing the top-side of the inner layer. The underside of the outer layer may be coated with a conductive material such as Tin Oxide or Indium Tin Oxide. The top-side of the inner layer may also be coated with a conductive material such as Tin Oxide or Indium Tin Oxide. The conductive materials coating the outer layer and inner layer may have the same composition. While the outer layer may be flexible, the inner layer may generally be rigid and may be made of glass, plastic, a combination of the two, or another rigid transparent or translucent material.

The outer layer and the inner layer may be spaced apart, for example, by a plurality spacers between the outer layer and inner layer. The spacers may be disposed at regular intervals. When a user interacts with the touchscreen by touching it, such user deforms the outer layer such that the two conductive materials of the respective layers make physical contact. The CPU 202 determines and/or receives the resistance of both layers at their point of contact and, when the CPU 202 determines that the resistance has changed more than a predetermined amount, it determines that a user is engaging/activating (i.e., touching) one or more points on a screen. Based on determining one or more coordinates that the user is activating, the CPI 202 may determine that a user wishes to take certain actions such as typing on a keyboard displayed on a touchscreen, clicking on a hyperlink, and the like.

In the alternative, or in addition to a resistive touchscreen, the electronic device 200 may include a capacitive touchscreen. A capacitive touchscreen also includes two layers and be coated with a conductive material, as described above with respect to the resistive touchscreen. However, in a resistive touchscreen, both layers are comprised of glass. The resistive material coatings may be parallel stripes each being at a first angle on a first layer and a second angle on a second layer, the two angles forming right angles (thereby forming a grid when combined). The resistive material coatings may also form a grid on each layer or coat the entire area of the layer. When a user of the electronic device 200 touches the screen, the local electrostatic field is modified (or distorted) such that the CPU 202 may monitor one or more capacitors on the layers to determine where a user change the capacitance and modified the local electrostatic field. As a result, the CPU 202 determines that a user is activating (i.e., touching) one or more points on a screen and may thus determine various actions the user is taking.

By using either a capacitive touchscreen or a resistive touchscreen, the user may interact with electronic device 200. The user, for example make certain gestures that may be interpreted by CPU 202 as certain actions. For example, a user may engage with the screen using two fingers starting a certain distance apart and bring such fingers closer together. Such action may be interpreted by CPU 202 to zoom out of the screen. The user may also engage with the screen by beginning the gesture with two fingers together and then moving them apart. Such action may be interpreted by CPU 202 to zoom into the screen. The user may also double tap on a particular portion of the screen. That is, the user may touch a point, remove his finger from such point within a predetermined period of time (such as ¼ second), touch the point (or another point within a predetermined distance of the first point) again and removes his finger within a predetermined period of time again. The previous action may be performed without the final removal. Such action may be interpreted as a selection of text at or near the two points (the first touch and second touch). The CPU 202 may search for any text or images to be selected at the first point, second point, or a midpoint between the first point and the second point. Once the selection is made by CPU 202, a user may modify such selection by, for example, touching and dragging the selection to shorten, extend, or change the selection to a different selection.

The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU). Also, for example, the processor can be central processing logic. Central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the systems and methods for interactive video generation and rendering program 223. The ROM 232 can also include Basic Input/Output System (BIOS) 220 of the electronic device.

The systems and methods for interactive video generation and rendering program 223 is intended to broadly include or represent all programming, applications, algorithms, software and other tools necessary to implement or facilitate methods and systems according to embodiments of the invention. The elements of systems and methods for interactive video generation and rendering program may exist on a single server computer or be distributed among multiple computers, servers, devices or entities, which can include advertisers, publishers, data providers, etc. If the systems and methods for interactive video generation and rendering program is distributed among multiple computers, servers, devices or entities, such multiple computers would communicate, for example, as shown on FIG. 1.

The power supply 206 contains one or more power components, and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the systems and methods for interactive video generation and rendering, via a network to another device. Also, an application server may, for example, host a Web site that can provide a user interface for administration of example aspects of the systems and methods for interactive video generation and rendering.

Any computing device capable of sending, receiving, and processing data over a wired and/or a wireless network may act as a server, such as in facilitating aspects of implementations of the systems and methods for interactive video generation and rendering. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example systems and methods for interactive video generation and rendering. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for interactive video generation and rendering. Content may include, for example, text, images, audio, video, and the like.

In example aspects of the systems and methods for interactive video generation and rendering, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers, integrated devices combining one or more of the preceding devices, and the like.

Client devices, as may be used in example systems and methods for interactive video generation and rendering, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Client devices, such as client devices 102-106, for example, as may be used in example systems and methods for interactive video generation and rendering, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the systems and methods for interactive video generation and rendering, one or more networks, such as networks 110 or 112, for example, may couple servers and client devices with other computing devices, including through wireless network to client devices. A network may be enabled to employ any form of computer readable media for communicating information from one electronic device to another. A network may include the Internet in addition to Local Area Networks (LANs), Wide Area Networks (WANs), direct connections, such as through a Universal Serial Bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and a telephone link.

A wireless network, such as wireless network 110, as in example systems and methods for interactive video generation and rendering, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in example systems and methods for interactive video generation and rendering, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Some embodiments include direct or indirect use of social networks and social network information, such as, for example, in targeted advertising or advertisement selection. A "Social network" refers generally to a network of acquaintances, friends, family, colleagues, and/or coworkers, and potentially the subsequent connections within those networks. A social network, for example, may be utilized to find more relevant connections for a variety of activities, including, but not limited to, dating, job networking, receiving or providing service referrals, content sharing, creating new associations or maintaining existing associations with like-minded individuals, finding activity partners, performing or supporting commercial transactions, etc.

A social network may include individuals with similar experiences, opinions, education levels and/or backgrounds, or may be organized into subgroups according to user profile, where a member may belong to multiple subgroups. A user may have multiple "1:few" circles, such as their family, college classmates, or coworkers.

A person's online social network includes the person's set of direct relationships and/or indirect personal relationships. Direct personal relationships refers to relationships with people the user communicates with directly, which may include family members, friends, colleagues, coworkers, and the like. Indirect personal relationships refers to people with whom a person has not had some form of direct contact, such as a friend of a friend, or the like. Different privileges and permissions may be associated with those relationships. A social network may connect a person with other people or entities, such as companies, brands, or virtual persons. A person's connections on a social network may be represented visually by a "social graph" that represents each entity as a node and each relationship as an edge.

Users may interact with social networks through a variety of devices. Multi-modal communications technologies may enable consumers to engage in conversations across multiple devices and platforms, such as cell phones, smart phones, tablet computing devices, personal computers, televisions, SMS/MMS, email, instant messenger clients, forums, and social networking sites (such as Facebook, Twitter, Instagram, and Google+), or others.

One embodiment of the present invention includes systems, methods, and a non-transitory computer readable storage medium or media tangibly storing computer program logic capable of being executed by a computer processor, for generating and rendering video (sometimes referred to as an application or a tool) as herein further described.

In an embodiment of the present invention, data such as image data or other media data may be stored on client device 106 or on one of servers 107-109 or 113. Data may be received by client device 106 with a predefined list of animatable attributes for each of the data (such as an image file or another media file). The data may be from a third-party website, server, web-embeddable resource connected to the client device 106 via networks 110 and 112, local data such as media files (e.g., TIFF, JPG, GIF, RAW, BMP, MOV, MP4, MPG, AVI, WAV, AIFF, etc.), or any other suitable source for data. For a particular set of attributes, there may be only a single image data or other media data that maps to such particular set of attributes.

The tool is loaded on client device 106. This may include, for example downloading, by the client device 106, an application from the application server 109. The tool may store a list of predefined third-party resources or data sources it will use. Instead of being pre-defined, such resources may instead or in addition (to the predefined third-party resource or data sources) be chosen by a user of client device 106 in real-time or selected by the user and the selection stored in memory 230. After the tool is loaded, the client device 106 communicates with the third-party resource through an Application Programming Interface (API), or by receiving the data (e.g., image files) through any suitable method, and the tool animates through any of these attributes by requesting and setting each of their values accordingly. That is, for example, once a plurality of sets of attributes are selected, the data (such as image files) are selected based on the attributes and the plurality of data are displayed in sequence to create an animation (e.g., video). The third-party resource, which may be stored on servers 107-109, 113 or client device 106, or any other suitable resource, provides the visual (or other) content that the tool animates, as well as the list of what parameters are animatable through the tool's interface, which may be a graphical user interface.

In an embodiment, the tool may be a browser-based tool that allows users to interact with, and animate, a third-party web resource. In another embodiment, the tool may be a mobile-based application or desktop application. In yet another embodiment, the tool may not utilize a third-party resource, instead utilizing data located within the application or tool, or populated directly into the tool, and stored on client device 106. For example, the tool may be utilized using a user's own imagery source, or any other local resource, instead of a third-party resource.

In an embodiment, the tool utilizes data from any suitable source, such as a third-party website or web-embeddable resource, as well as a predefined list of animatable attributes for it. The tool is loaded, specifying which list of predefined third-party resources it will use. The tool then communicates with the third-party resource through an API, and then generates an animation through any of these attributes by requesting and setting each of their values accordingly.

It should be noted that while a third-party resource may provide the visual content, as well as the list of parameters that are animatable, the tool provides a custom interface to access the animatable data, and processes the data to provide animation and automation of the data.

In an embodiment of the present invention, the tool: (1) retrieves data from a third-party; (2) animates the data; and (3) automates the rendering of the data by providing customizable video generation tools.

Figure 3:
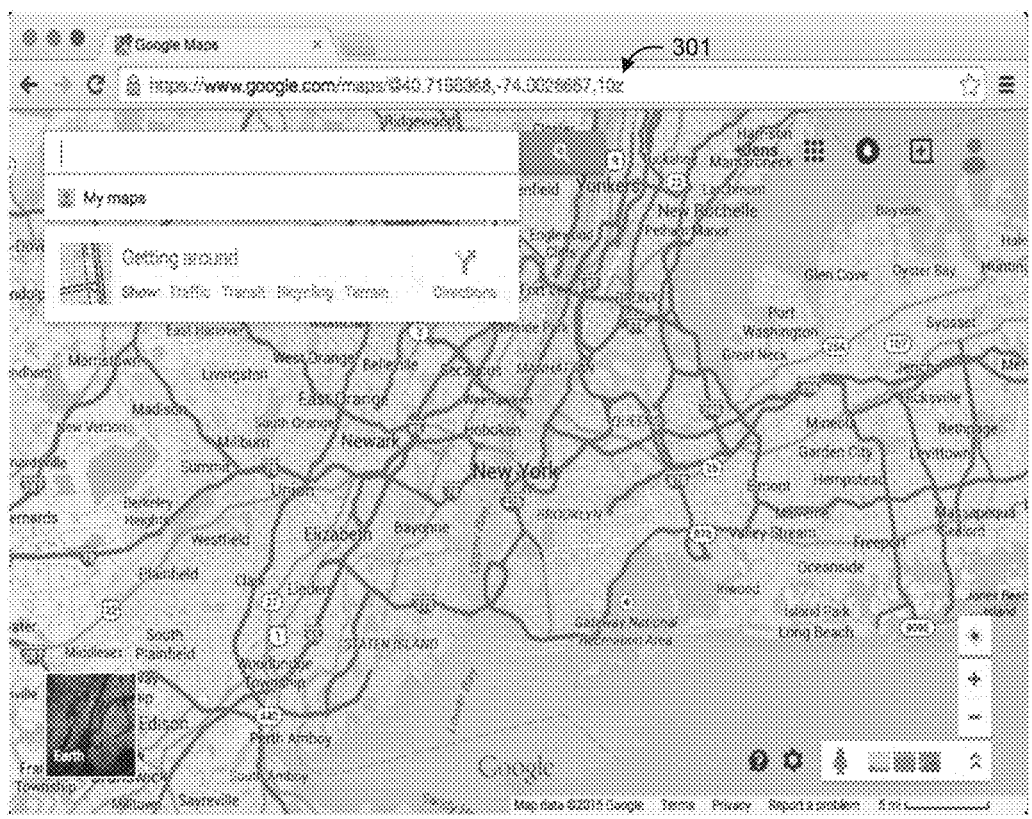
FIGS. 3-4 illustrate a third-party resource of one or more aspects of systems and methods for interactive video generation and rendering according to one embodiment of the invention.

Referring to FIG. 3, in an embodiment of the present invention, the third-party resource or website may be a provider of mapping data, such as, for example, Google Maps, Google Earth, or any other suitable provider.

As shown in FIG. 3, a user of client device 106 may access one or more of servers 107-109 or 113. The user, either manually, or via the tool, may access a Uniform resource Locator (URL) on a third-party (or other) website hosted on one or more of servers 107-109 or 113. The third-party website may include a URL 301, in this case https://www.google.com/maps/@40.7188368,−74.0026667,10z. The URL contains a listing of three parameters following the @ character. Upon accessing the webpage of the URL, a user of client device 106 is shown an image that corresponds to the three parameters in the string following the @ character. That is, the three parameters shown in the URL determine the image provided to the user. In the example above, the three parameters are latitude (40.7188368), longitude (−74.0026667), and zoom level (10z), respectively. Upon receiving the string, the web server (or another server in communication with the web server) parses the string to determine the substring following the @ character. The server then parses the substring by searching for one or more separator symbols, in this case, for example, a comma. The server then extracts the three strings, "40.7188368" "−74.0026667" and "10z" by determining that these strings are separated by commas. If a separator symbol is a part of one parameters, the server can be instructed not to treat such symbol as a separator symbol by using an escape character such as "\". For example, if the user preferred to express the latitude by using a comma instead of a period ("40,7188368"), the string "40\,7188368" may be used. The web server would then parse the string and when parsing the "\" it would determine that the following symbol is not a separator symbol, remove the escape character "\" and determine "40,7188368" to be the latitude.

Once the server parses and determines the plurality of parameters, it then determines what type of parameter each of the parameters corresponds to. That is, although the server has determined that the parameters are "40.7188368" "−74.0026667" and "10z" (based on the separators), it has not yet determined what type these parameters represent (i.e., which of the parameters is latitude, longitude, and zoom). This determination may be accomplished in several ways. In one embodiment, the server may determine the type of each parameter by the order in which they appear in the original string. That is, the first parameter may be presumed by the server to be the latitude, the second parameter as longitude, and the third parameter as zoom. However, this approach may not solve the problem of properly determining parameters if the parameters are in the string out of the order the server expects them to be in. For example, if "10z" is the first parameter in the string instead of the third and the server attempts to use "10z" as a latitude (by using the ordering approach above), no image would be shown to the user since "10z" is not a valid latitude (i.e., no image has a latitude attribute of "10z"). Thus, one solution to the above problem would be to first use the ordering approach, determine whether each of the parsed strings is a valid parameter and, if not, perform a second determination. In the above example, it may be known by the server that any string that contains a substring "z" is the zoom parameter. Thus, when the server first determines that "10z" is a latitude based on its order, then determines that "10z" is not a valid latitude, it would then determine that "10z" contains a substring "z" and instead finally determine that "10z" is a zoom, not a latitude. The server may also not consider order at all and only consider the value of each of the separated strings. For example, the first (or any) string may be "40.7188368L" and when the server determines that the string includes "L", it would strip out the "L" and determine "40.7188368" to be the latitude.

It should be noted that these parameters are illustrative parameters, and additional parameters may be provided such as, but not limited to, altitude, atmosphere, weather, clouds, sun, camera exposure, camera focal distance, camera field of view, camera target/point of interest, camera angle/rotation, blur, sea water, time of day, date, time of year, humidity, model of camera that took image, etc.

The URL 301 for FIG. 3 above directly incorporates the three parameters into the URL (where, for example, the string following the "@" symbol indicates a query string to be parsed), but it should be noted that a URL does not need to indicate the parameters within the URL. Instead, in one embodiment, the URL may give no direct indication as to what parameters are configured on the webpage with which the URL is associated. However, the webpage itself may be configured with one or more parameters. For example, https://www.google.com/maps/12345 may be configured to link to, or otherwise associate with, the identical webpage containing the latitude, longitude and zoom parameters discussed above (or any other parameters).

The tool therefore provides for changing one or more of the parameters. Upon changing a parameter, such as a zoom level, latitude, longitude, and the like, a new image is generated (and/or retrieved and then displayed to the user). In the case of changing the zoom level, but keeping latitude and longitude constant, a new image of the same location is generated, with only the level of zoom in the image having changed.

Changing the URL directly can change the parameter, which causes the webpage associated with the URL to change. Thus, changing the URL above to https://www-.google.com/maps/@40.7188368,−74.0026667,12z causes the zoom level, now 12z instead of 10z, to change, thereby causing the zoom of the image to change. Alternatively, as discussed above, the URL may not directly indicate the parameters within the URL, but instead may just be associated with a unique webpage view. Thus, for example, changing the URL from https://www.google.com/maps/12345, which had been associated with 10z zoom level discussed above, to https://www.google.com/maps/12367 may cause the zoom level of the image to change to whatever webpage zoom level is associated with that URL (such as 12z).

Figure 4:
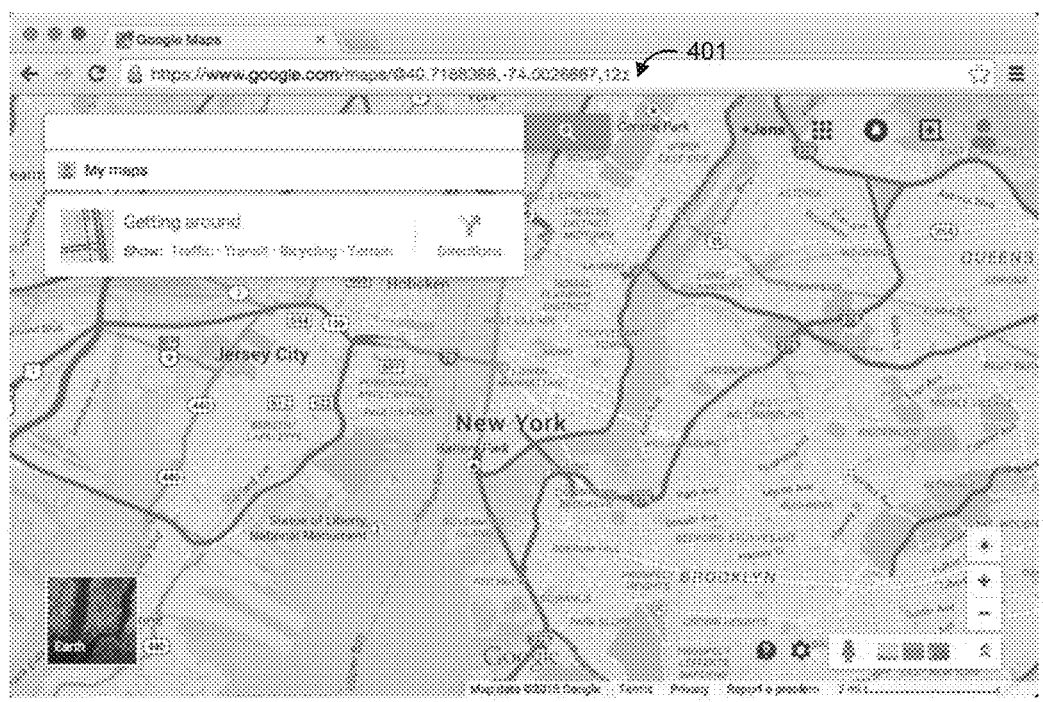

FIG. 4 illustrates the change to the third parameter in URL 401. That is, FIG. 4 shows the identical latitude and longitude as FIG. 4 but with a greater zoom value (12z instead of 10z).

In accordance with the invention, using two or more images with at least one changed parameter allows a user to create an appearance of motion between the two images. This motion may appear as continuous motion (e.g., animation or video). In the example above, changing the third variable in the URL (the zoom, or "z" variable, which controls the zoom level of the map) causes multiple images with variable zoom levels to be displayed. By taking a plurality of these images and playing them back (i.e., displaying them) in succession, an embodiment of the present invention allows a user to experience a zooming in on the map.

It should be noted that, while a map is being used to illustrate the invention, the invention is contemplated with any series of images (or other media), and is not restricted to mapping. That is, one or more images may be retrieved and displayed in succession and such images need not necessarily be mapping related images.

Thus, embodiments of the present invention provide a user interface for automating the changing of parameters between a series of images.

In accordance with one embodiment of the invention, the tool provides an interface to automate the process of determining/selecting an external resource's attributes by retrieving a plurality of images associated with such attributes reflecting the change in these attributes, such as latitude, longitude, and altitude, and then stitching the images together to create an animation.

Figure 5:
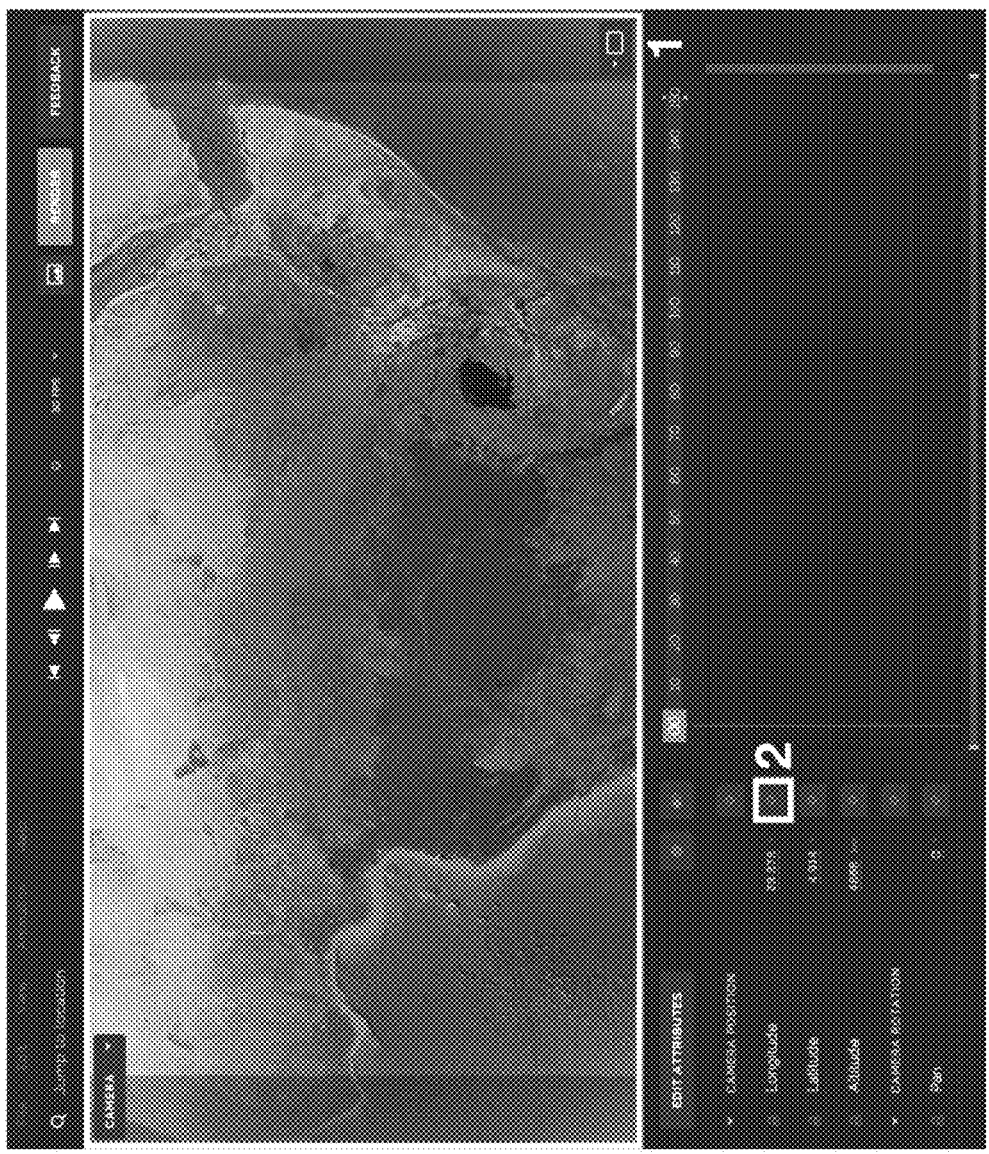
FIGS. 5-12 illustrate Graphical User Interfaces of one or more aspects of systems and methods for interactive video generation and rendering according to one embodiment of the invention.

FIG. 5 depicts a Graphical User Interface ("GUI") for the tool. In this example, illustrative parameters include camera position (shown on the bottom left), which further includes longitude, latitude and altitude, as well as camera rotation (shown on the bottom left), which includes pan. Changing any one of these parameters, as well as any other suitable parameters, generates a second image, thereby allowing for animation of a sequence between the two or more images.

Using the tool as shown in FIG. 5, an interface is provided to the user to automate the process of altering one or more attributes. Taking a series of images and "stitching" the screenshots/images together to create an animation can accomplish this.

In accordance with an embodiment of the invention, the tool is able to playback in substantially real-time (e.g., within one second of the user action), images that correspond to a change in one or more of the resource attributes, such as one or more parameters (e.g., a change altitude, longitude, latitude and/or zoom). For example, for a "zoom-in" effect with constant latitude and longitude, the parameter that changes is the zoom, while latitude and longitude are constant. Multiple images are generated for a video sequence portraying the zooming in, with each image corresponding to a different zoom level. When a user interacts with the source of the data, whether through an external resource or internal resource, a change is detected. In some instances, the change may be coded into the URL itself, as discussed above. In accordance with an embodiment of the invention, the user may directly make changes to a URL, changing the parameters (e.g., longitude, latitude, altitude, etc.). If the URL is updated, the tool detects the change, analyzes the updated URL, and, in real-time, updates the displayed attribute values in the interface and retrieves the image associated with the attributes in the URL. The tool may also analyze the image associated with the updated URL, and immediately update the attribute values associated with the updated image in the interface.

The tool utilizes a range of interface elements (e.g. buttons, sliders, text-fields, graphs, etc.) to visually display the current state of the external resource's attributes (e.g., latitude, longitude, altitude, etc.) and will keep the state of these elements and the state of the external resource synced. If the user interacts with the tool's interface elements, any changes that are made to the interface will then immediately be applied to the external resource's attributes (e.g. the user moves a latitude slider in the interface, which will also affect the external resources latitude, effectively moving the globe). The state of the external resource can be set by the tool either by directly setting the attribute values or by updating the source URL of the embedded resource to accurately reflect the new attribute values. The user may also choose to interact with the embedded external resource directly to change its state, which may also update the embedded resource's source URL. Based on this change, the interface will update accordingly, to represent the new state of the external resource (e.g., moving the globe or a map in the embedded resource by dragging it with the mouse, will update the latitude and longitude values that are currently displayed in the interface).

FIG. 5 above shows an example in which a user has set the longitude, latitude and altitude parameters to desired locations (e.g., longitude to 23.375, latitude to 4.914, and altitude to 4666 km). The user may select the desired location, which is made up of the longitude, latitude and altitude parameters. It should be noted that the user may input some or all of the parameters individually. Alternatively, the user may select a point on the map using, for example a mouse, keyboard, or another input device, and the tool may populate the parameters automatically. The user may then click or select the keyframe button 2. Clicking the keyframe button 2 would then set a keyframe and store that keyframe (i.e., store the current parameters to be used in a sequence of images in the animation).

An illustrative sequence may include: (1) going to the web address of the tool and loading the site; (2) the tool then initializes and creates all elements that are necessary to display its interface, as well as an iframe HTML element to display the external resource in; (3) the tool uses an iframe HTML element to display the external resource in (an iframe allows an external HTML document (external resource) to be embedded inside another HTML document (the tool) and allows the iframe's source URL to be changed and reloaded to display different content without having to reload the document that it has been embedded in); (4) receiving user interaction with the iframe to influence the map (i.e., when the user interacts with the map, the URL of the iframe changes); (5) once the user changes a parameter, such as altitude, longitude or latitude, changing the URL and the accompanying webpage to correspond to the new parameter; (6) creating a keyframe to store the current change state of the external resource; and (7) store the new keyframe data object in memory as a keyframe for the attributes.

Keyframes allow for the automation of altering the attributes, accessing the corresponding external resource (e.g., accessing the relevant screenshot/image associated with the altered attributes), and capturing screenshots of the change. A keyframe may be defined as a point within a certain time frame or timeline at which the user sets a certain state or attribute value (or a plurality of attribute values). The keyframe represents (1) the time within the animation that the keyframe is located at (e.g., 50 milliseconds after start); (2) the value of the attribute at that point; and (3) information about how the value should transition between this keyframe and the surrounding keyframes. Using mathematical functions, the tool allows for interpolation between the values of defined states (e.g., linear interpolation:

$$y = y_a + (y_b - y_a)\frac{x - x_a}{x_b - x_a} \text{ at the point } (x, y),$$

where y is the calculated value at time x, $y_a$ is the value of keyframe a, $y_b$ is the value of keyframe b, $x_a$ is the time of keyframe 1 and $x_b$ is the time of keyframe b. Interpolation therefore allows for inserting, by the tool, of additional attribute values (i e, sets of attributes), to fill in those not added by the user (e.g. calculation of values in between keyframes based on Bezier curve transitions):

$$B(t)=(1-t)^3P_0+3(1-t)^2tP_1+3(1-t)t^2P_2+t^3P_3, t\in[0,1],$$

t=time, $P_0$ is a first keyframe, P1 describes the transition point out of $P_0$, P describes the transition point into P, and P is a second keyframe. The keyframes may refer to the same type of single attribute. For example, the keyframes may each refer to latitude at a particular time. In the alternative, the keyframes may refer to a plurality of variables (e.g., latitude, longitude and altitude). For example, This creates additional steps in between the user-defined points, and serves to create a smoother transition and clearer animation. That is, it is as if there are additional keyframes between the actual keyframes (i.e., additional iframes are added between the user selected keyframes). The number of iframes inserted between the keyframes is determined based on the amount of time set by the user between the iframes. For example, if there is a keyframe at time 0 seconds and another keyframe at time 1 second, an additional 29, or 30 iframes may be inserted by the tool so as to make the animation smoother.

For example a keyframe at second 1 may have a latitude value of 0, and a keyframe at second 3 may a latitude value of 100. These values may be input by the user. The user may not have put in a latitude value for second 2, but a latitude value is required to portray a smooth transition and animation. Thus, at second 2, the tool interpolates between the two keyframes from second 1 and 3, and assigns a latitude value at second 2 of, for example, 50, that causes the creation of a smoother transition between the two keyframes by having 3 (or more) iframes instead of 2. This allows the tool to define values in between user-input values, so that the user does not need to do so for each frame. For example, if the frame rate is 29 frames per second, the user is not required to define the value of each attribute for each of the 29 frames for each second (i.e., the user is not required to create 29 keyframes for each second). Instead, the additional keyframes are interpolated between keyframes the user sets. The user may also create keyframes with certain attributes set but not others. For example, the user may create a complete (e.g., including all attributes) keyframe for second 1 and 3 but second 2 may include some parameters (such as longitude and zoom) but be missing one or more other parameters (such as latitude). The tool would then, based on the input parameters of seconds 1, 2, and 3, determine and generate the missing attributes for the keyframe to be displayed at time second 2.

In another exemplary embodiment, a user may create three different frames for a timeline, such as frames 0, 17 and 30. The user then sets the altitude and zoom level for each of the three keyframes to be different values. Thus, at frame 0, the altitude may be "far out," from the surface of earth, at frame 17, it may be "closer in," and at frame 30 it may be "much closer." It should be noted that the altitude levels may be any suitable variants, and the levels discussed are merely for illustration. When the playhead (see FIG. 7, element "5", which allows a user to select a point in the timeline to view the iframe and/or manipulate any parameters associated with the keyframe at a particular location/time on the timeline (the timeline shows times 00, 10, 20, 30 . . . 150)) is moved to any other position between the keyframes 0, 17, and 30, the tool interpolates the values for the attribute (here the altitude) and set the external resource, such as Google Maps, to this specific value. Thus, the external resource provides the image at the determined interpolated value, allow for a smoother transition between the three provided keyframes, and reducing the choppiness of the sequence. That is, the additional 27 keyframes are interpolated, when the user provides only 3 keyframes.

Figure 6:
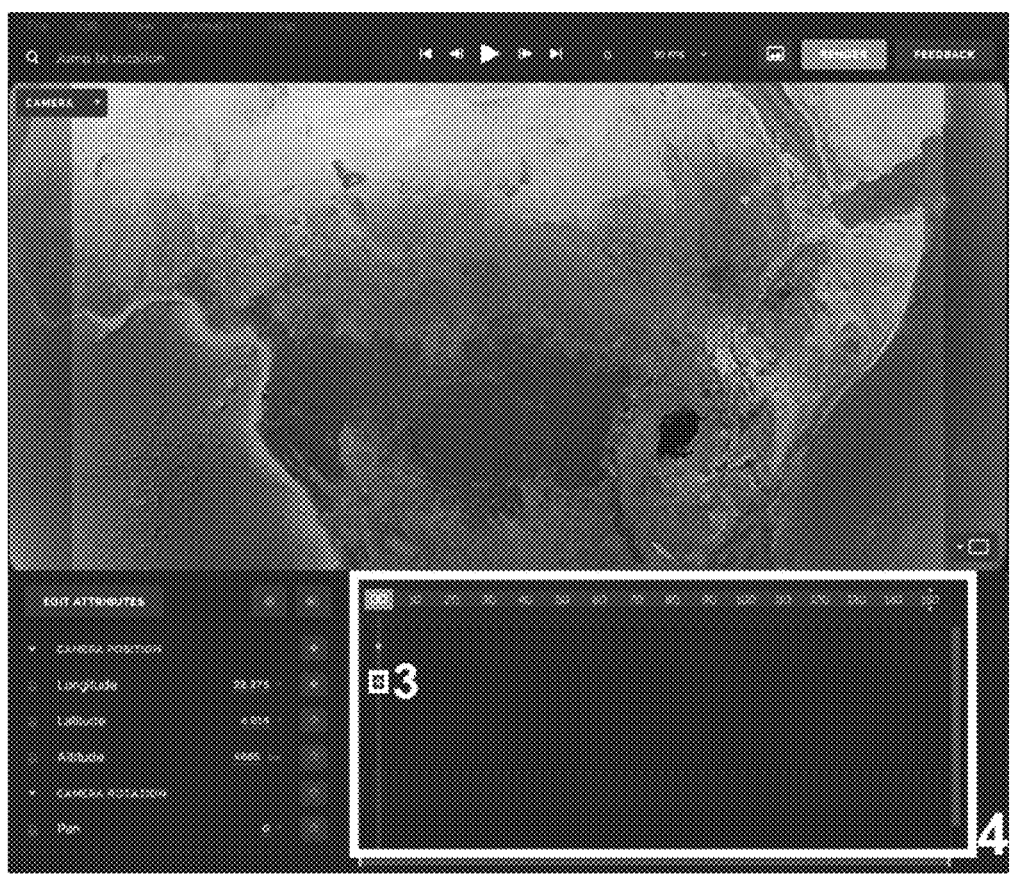

FIG. 6 above shows an example where a user has created a keyframe 3 for the attribute longitude. This keyframe has been created in the timeline 4, with the value set to the value returned from the map for the longitude attribute. That is, in this location on the map, the value 23.375 is set for the attribute longitude. This keyframe is stored internally in a project model, which includes attributes and their corresponding keyframes.

Figure 7:
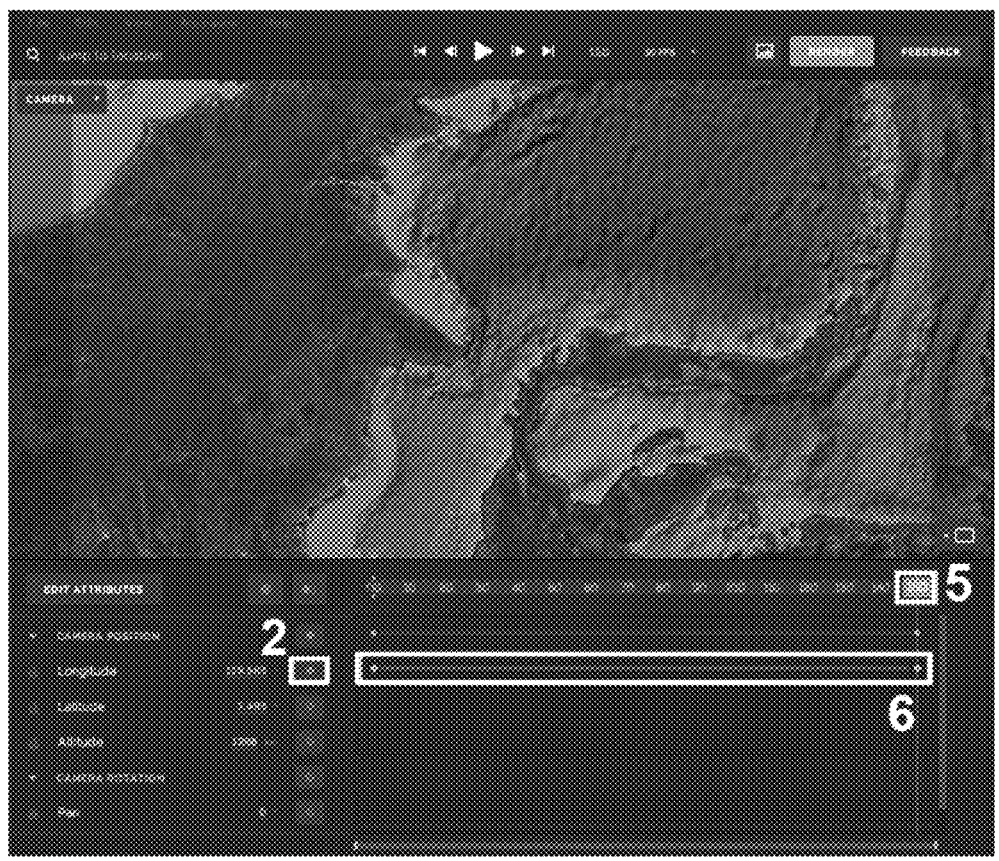

FIG. 7 shows that the user moves the playhead 5 to the end of the animation (time 150), and then repeats the first two steps of selecting the desired location, and selecting the keyframe button. This creates a new keyframe at the final frame, and, for example, a line connecting the two keyframes (denoted as "6"). The line denotes interpolated longitude values (or another parameter).

The tool may detect the user's mouse interaction, when dragging the playhead. The tool then updates the current time of the project's playback status. For example, in FIG. 7 above, there are 150 frames, and the playhead has been moved all the way to the right. When the user moved the playhead, the tool analyzes the new playhead position (e.g., current playhead position is frame 150, the project has a total of 150 frames, so the playhead position is at 100%) and then updates the external resource accordingly. Since the playhead is right on top of a longitude keyframe in the example above, the longitude of the external resource would then simply be set to that keyframe's value. If the user drags the playhead to frame 120, the tool would calculate the new playhead position (120/150=80%) and since there is no keyframe at that particular position, interpolate the value based on surrounding keyframes. For example, if the longitude keyframe at frame 0 had a value of 100°, and the longitude keyframe at frame 150 had a value of 200°, the tool interpolates the value at frame 120 (playhead position of 80%) and set the external resource to the interpolated value of 180° longitude (100°+(200°−100°)*0.8=180°).

The user may then move the map to a new position with a new iframe URL. At this point, the user selects, for example, the longitude keyframe button (i.e., the diamond shaped button to the right of the word "Longitude" on the left side of the screen below denoted as 2 on FIG. 7), which queries the current longitude value from the external resource. The tool then queries the current time for the playhead (e.g., at time 150). A new keyframe data object is then added and stored in memory as a keyframe for the attributes.

Figure 8:
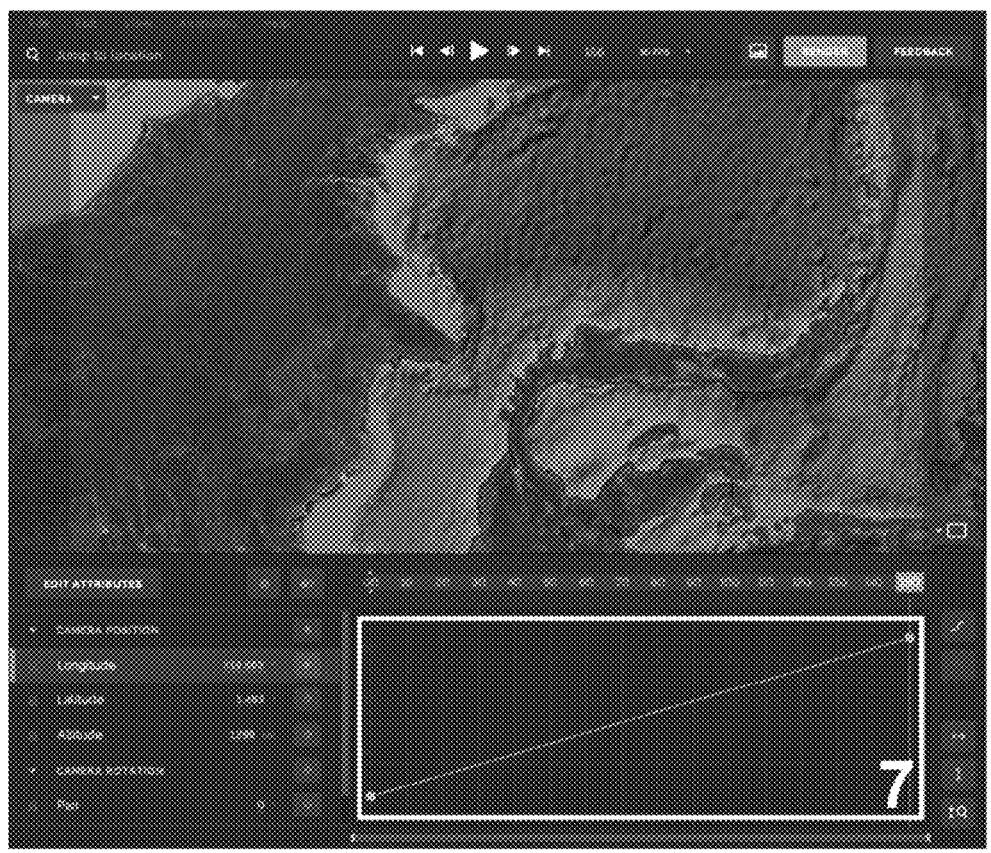

In FIG. 8, a value curve for longitude is shown for the animation sequence. That is, the curve shows the progression of the animation sequence along time 0-150, with the curve beginning at the longitude value of the first keyframe (time 0), and ending at the longitude value of the last keyframe (time 150). In this embodiment, the curve is a constant curve (i.e., a straight line), however an embodiment of the present invention is contemplated with any suitable curve, such as an accelerated pick-up or drop-off, or any other suitable curve. In this embodiment, the values in between the first keyframe and the last keyframe may be represented by, and calculated using, for example, a Bezier curve.

In FIG. 8, a line is calculated and displayed between the two points (the first keyframe and last keyframe), using the stored keyframe data. The curve then translates the data into X (corresponding to time) and Y (corresponding to value of a particular parameter such as longitude) axis coordinates, and connects the keyframes with a line to visually display the change of the value over time.

Figure 9:
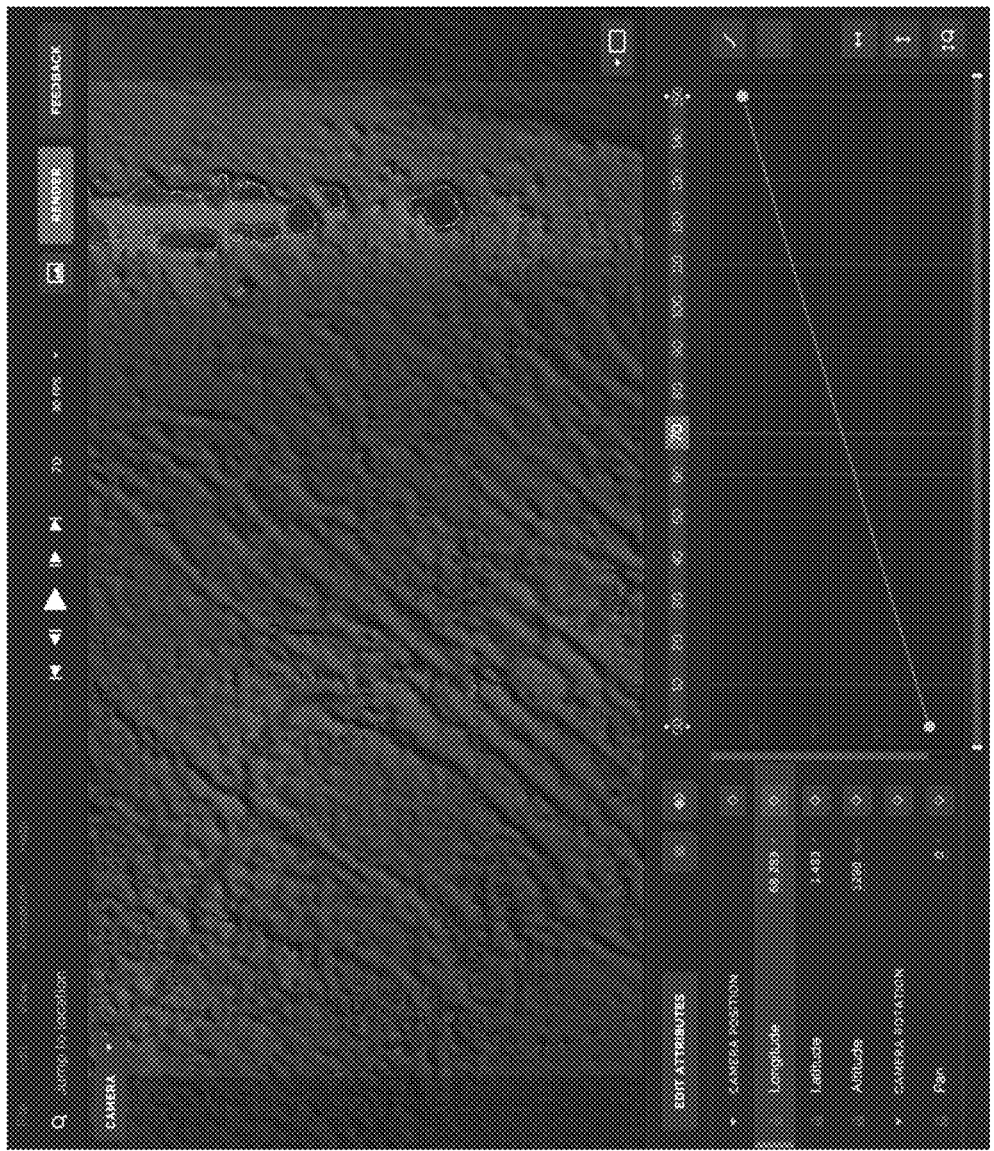

In FIG. 9, the user moves the playhead (with numbers ranging from 00 to 150 in this embodiment) to a different frame, in this case 70. As the user moves the playhead to a different frame, the value at that point in the curve is determined/calculated, and that value is used to determine the location on the map in the upper portion of the screen of FIG. 9. This then determines the value of the corresponding map attributes, such as longitude, latitude, and altitude, for that point in the curve, and the map updates accordingly. When the user plays back the animation, the value of each attribute at each frame is calculated, and the map is updated accordingly. This causes the animation to play back smoothly from the first to last keyframe.

Thus, where the curve between two keyframes is a straight line or a linear transition, as shown in FIG. 9, the value for any frame between the two keyframes can be calculated with linear interpolation based on the formula:

$$y = y_a + (y_b - y_a)\frac{x - x_a}{x_b - x_a} \text{ at the point } (x, y)$$

EXAMPLE

Example values for the two keyframes in FIG. 9

=>value at first keyframe=100°

=>value at last keyframe=200°

Formula for calculating interpolated values:

=>100°+(200°−100°)*ratio

Calculating the ratio in between the two keyframes at different times:

=>frame 0: 0/150=ratio 0

=>frame 50: 50/150=ratio 0.333333333

=>frame 120: 120/150=ratio 0.8

=>frame 150: 150/150=ratio 1

Calculating the interpolated values for the different frames:

=>frame 0: 100°+100°*0=100°

=>frame 50: 100°+100°*0.333333333=133.3333333°

=>frame 120: 100°+100°*0.8=180°

=>frame 150: 100°+100°*1=200°

When the user moves the playhead when the curve is a straight line or linear transition, the map's iframe is updated, either by directly setting the iframe's source URL, or by an API call.

Figure 10:
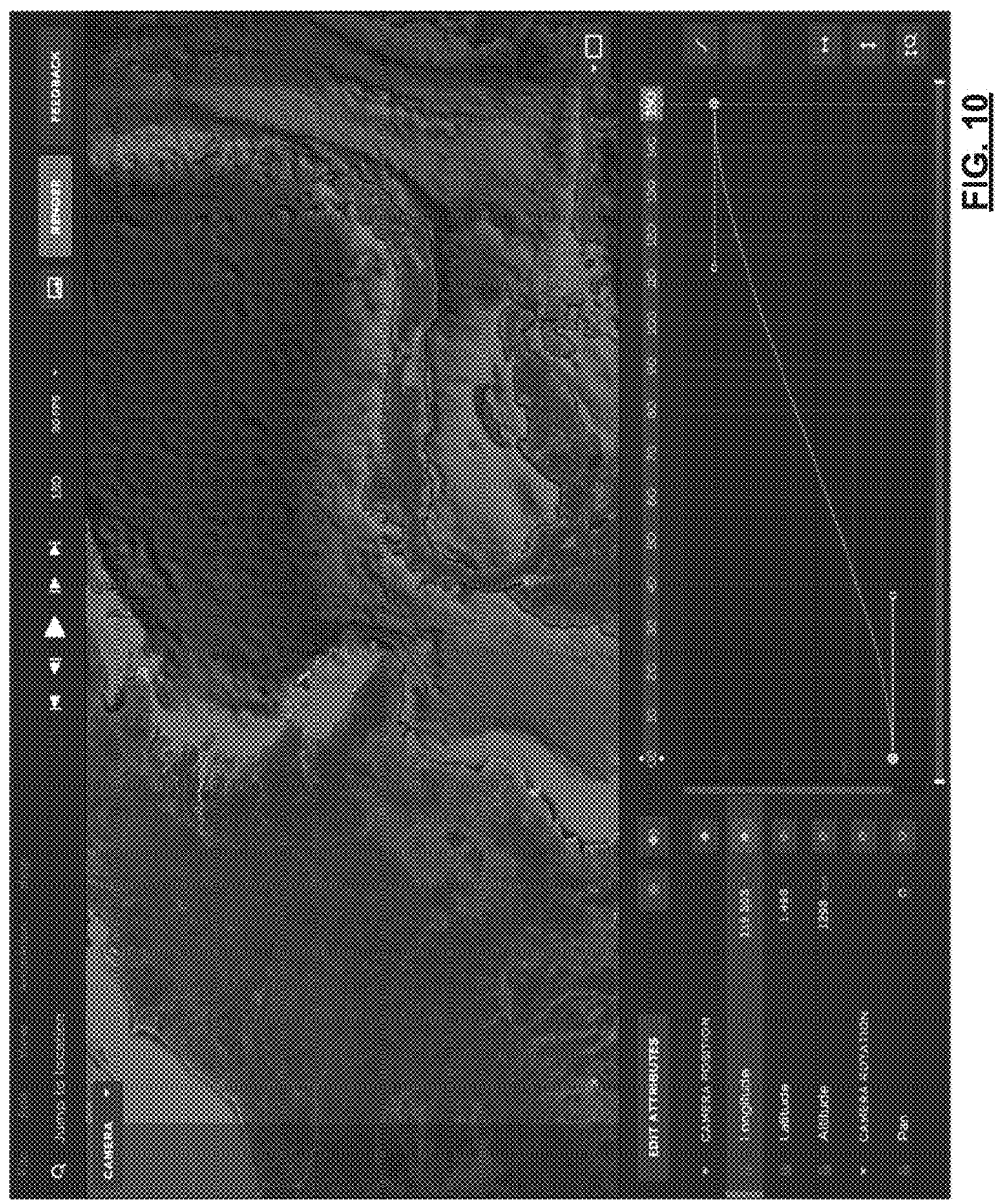

In FIG. 10, the user may apply different effects to transition of a particular parameter of the animation. Such effects may include easing the transitions in and out of the animation, or altering the curve, to control the keyframe animation from first to last keyframe. Such effects may also be made only for a subset of keyframes, for example, 00 to 38 and 112 to 150, and not all keyframes and/or iframes in the animation.

To give the user more control over how the value changes between two keyframes over time, the tool can switch the curve from a straight line to a Bezier curve. A cubic Bezier curve consists of four points: two points that indicate the ends/origins of the line and two control points that are used to manipulate the curve's direction. The control points influence the line and the further away from the originating point a control point is, the higher is the power of its influence on the direction of the line. Bezier curves model smooth curves and "ease" an operation, because the control points of the Bezier curve allows easy control of the velocity over time of the move in question.

Thus, within the tool, the line in between two keyframes (e.g. in FIG. 10) can be drawn on a HTML5 canvas element as a Bezier curve, using the HTML canvas BezierCurveTo method. The originating point is the first keyframe (x: keyframe.time, y: keyframe.value); the endpoint of the Bezier curve is the second keyframe (x: keyframe.time, y: keyframe.value). The Bezier curve's control points are based on the keyframes' transition values.

The user has the ability to change the four parameters of the Bezier curve by changing any of the points used to calculate the Bezier curve. The tool detects a user's mouse interaction, in order to determine if a point of the curve is being dragged by the user. If the user drags a point to a new position, the keyframe data will be set to the new values according to the new point position and the Bezier curve will be recalculated based on the new point locations (i.e., all keypoints may be recalculated based on the dragging). This will also alter the interpolated values in between the keyframes and in return alter the values that the external resource will be set to.

The value of a frame is calculated based on the formula of the Bezier curve: $B(t)=(1-t)^3 P_0 + 3(1-t)^2 t P_1 + 3(1-t)t^2 P_2 + t^3 P_3$, $t \in [0,1]$. Since the Bezier curve's x-axis represents time, and its y-axis represents the value, to find out the map's attribute value for a certain frame, the tool calculates the y-position of the Bezier curve at that particular time's x-position. This means, similar to the linear interpolation, it can be used to calculate additional steps between keyframes to make the transition between the keyframes smoother. The Bezier curve formula can also be used to create additional values between two keyframes according to the shape of the Bezier curve.

Figure 11:
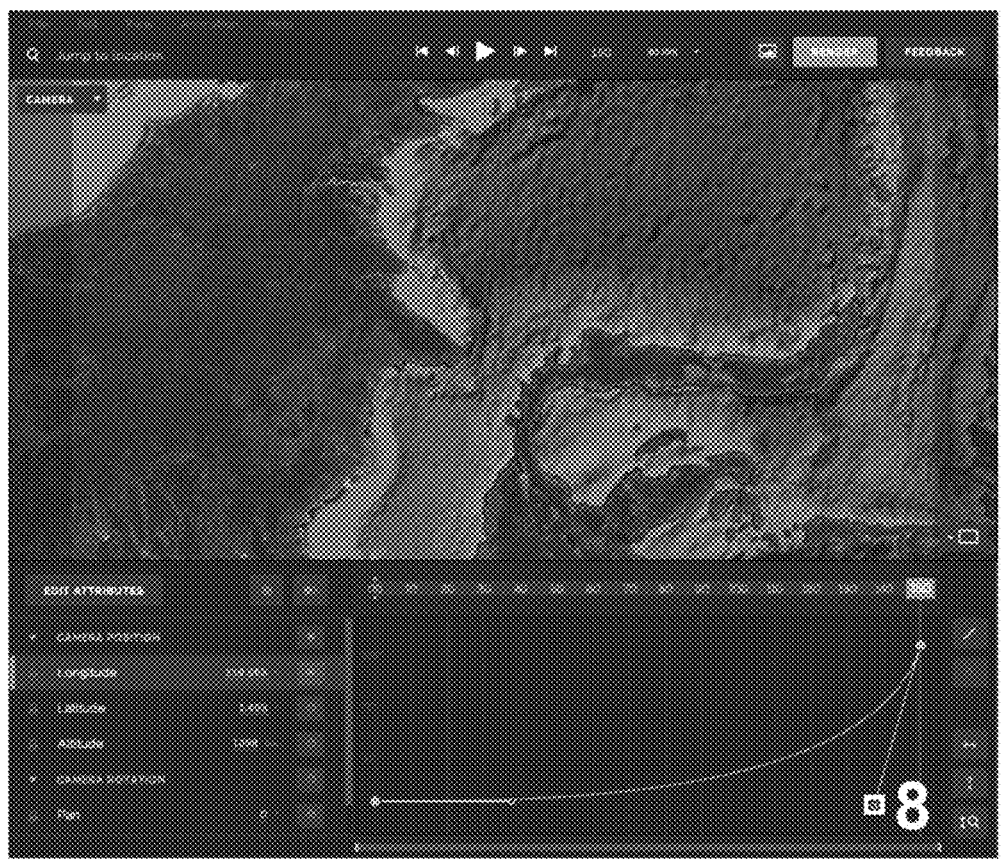

In FIG. 11, the user can move the Bezier control point (denoted as "8") for a specific keyframe to alter the shape of the curve. This alters the animation between the keyframes, because the values in between two keyframes are based on the Bezier curve's formula: $B(t)=(1-t)^3 P_0 + 3(1-t)^2 t P_1 + 3(1-t)t^2 P_2 + t^3 P_3$, $t \in [0,1]$. In its current shape in FIG. 11, the curve of the example consists roughly of the following points: P0 (x:0, y:30°), P1 (x:38, y:30°), P2 (x:137, y:30°), P3 (x:150, y:120°). Using the variable t, the tool calculates positions on the Bezier curve to calculate additional steps in between the two keyframes. In the example above, the value for t=0.5 would be approximately 40°, the value for t=0.8 would be approximately 60°. By moving the points of the curve around, the values in between will also change based on the Bezier curve calculation. If the user moves the right control point (denoted as "8") all the way to the left, for example, the curve would now be calculated with the following points: $P_0$ (x:0, y:30°), $P_1$ (x:38, y:30°), $P_2$ (x:0, y:30°), $P_3$ (x:150, y:120°), which would put the value for t=0.5 at approximately 70° and the value for t=0.8 at approximately 100°. Thus, drastically altering the shape of the curve and the values of the external resource gets set to as well as the ease of the animation that is being created.

Figure 12:
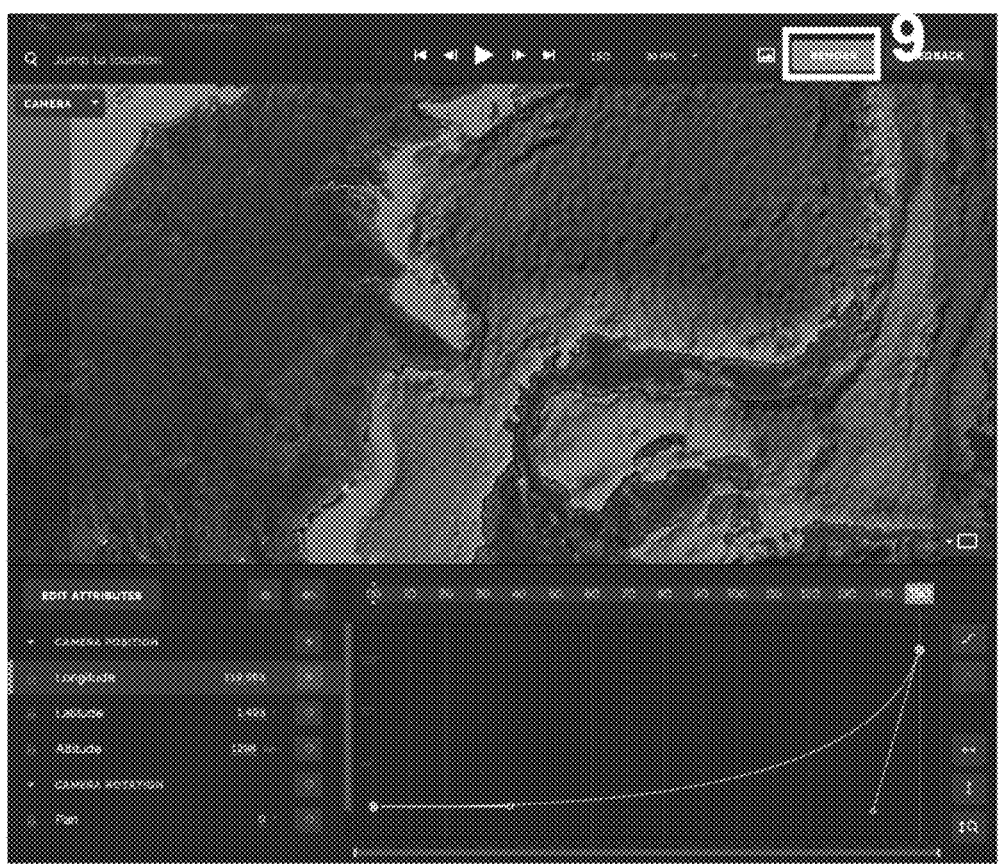

In FIG. 12, each frame of the animation is stepped through, and the attribute values are calculated by the tool. A screenshot of the map is captured at each frame, and may be stored as an image file. When all frames are captured, the frames are combined to create an animation/video.

It will be understood by those skilled in the art that each of the above steps will comprise computer-implemented aspects, performed by one or more of the computer components described herein. For example, communications and calculations of thresholds may be performed electronically. Determination of threshold violations, monitoring parameters, and communicating the threshold violations may be performed electronically. In at least one illustrative embodiment, all steps may be performed electronically—either by general or special purpose processors implemented in one or more computer systems such as those described herein.

It will be further understood and appreciated by one of ordinary skill in the art that the specific embodiments and examples of the present disclosure are presented for illustrative purposes only, and are not intended to limit the scope of the disclosure in any way.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media that can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data, which cause a general-purpose computer, special purpose computer, or special purpose-processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that performs particular tasks or implement particular abstract data types, within the computer. Computer-executable instructions, associated data structures, and program modules represent examples of the program code for executing steps of the methods disclosed herein. The particular sequence of such executable instructions or associated data structures represents examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where local performs tasks and remote processing devices that are linked (either by hardwired links, wireless links, or by a combination of hardwired or wireless links) through a communications network. In a distributed computing environment, program modules may be located in both local and remote memory storage devices.

Figure 13:
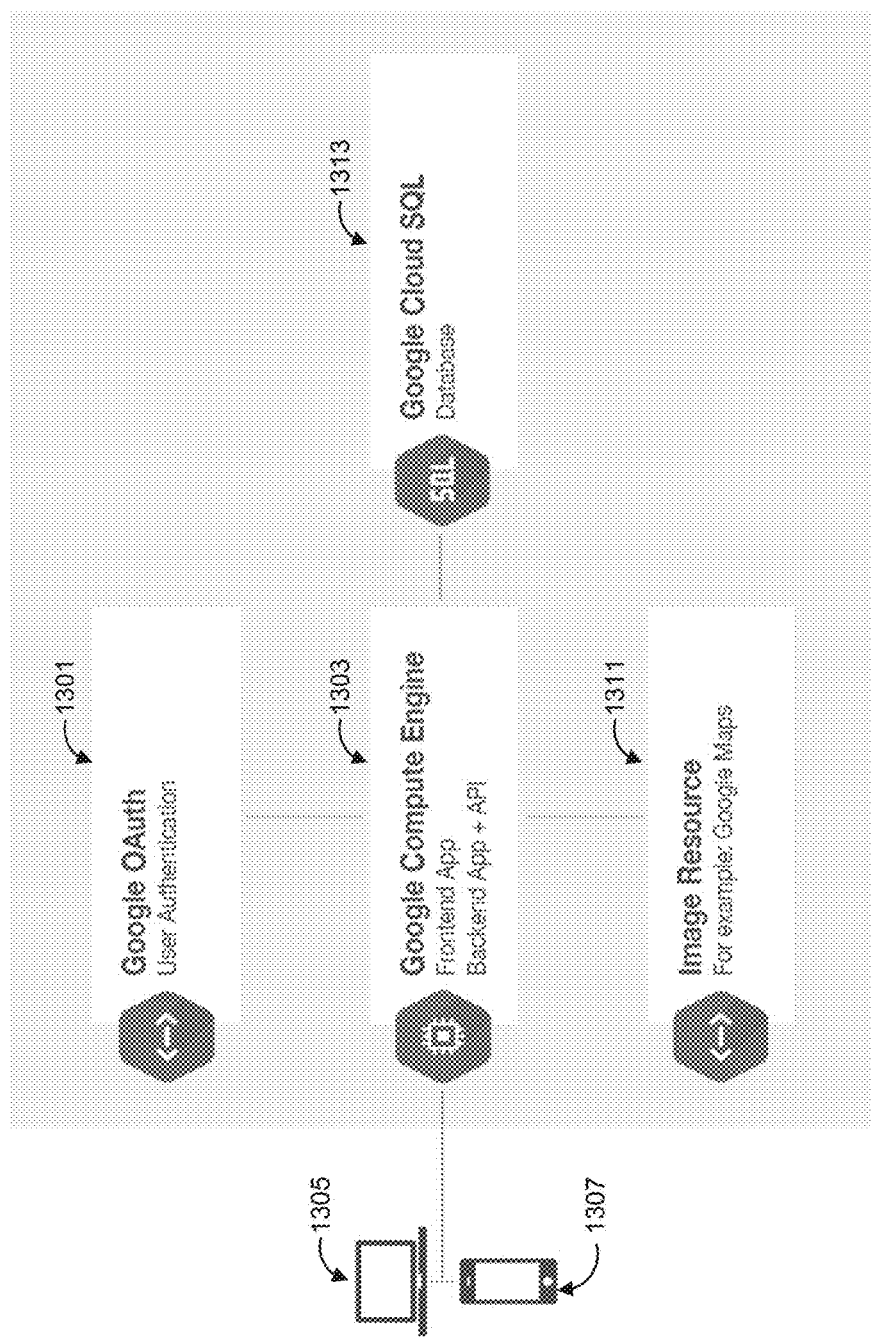
FIG. 13 illustrates a server architecture of one or more aspects of systems and methods for interactive video generation and rendering according to one embodiment of the invention.

Illustrative processes in accordance with the invention for application initialization may include:

Server architecture is illustrated in FIG. 13. The frontend (HTML+JavaScript+CSS+image/font/media files, served through an nginx webserver) and backend 1303 of the tool (Python application, used for user authentication and providing an API to communicate with the database, served through a Gunicorn Python WSGI HTTP Server) are currently hosted on Google Compute Engine virtual machine instances. The frontend may be displayed on a mobile device 1307 or personal computer 1305 (both equivalent to client device 106). Users are authenticated through communication with Google's OAuth service 1301. The database is a MySQL database hosted in Google's Cloud SQL architecture 1313. The remaining server architecture component is the external image resource 1311, which is provided by a third-party.

Figure 14:
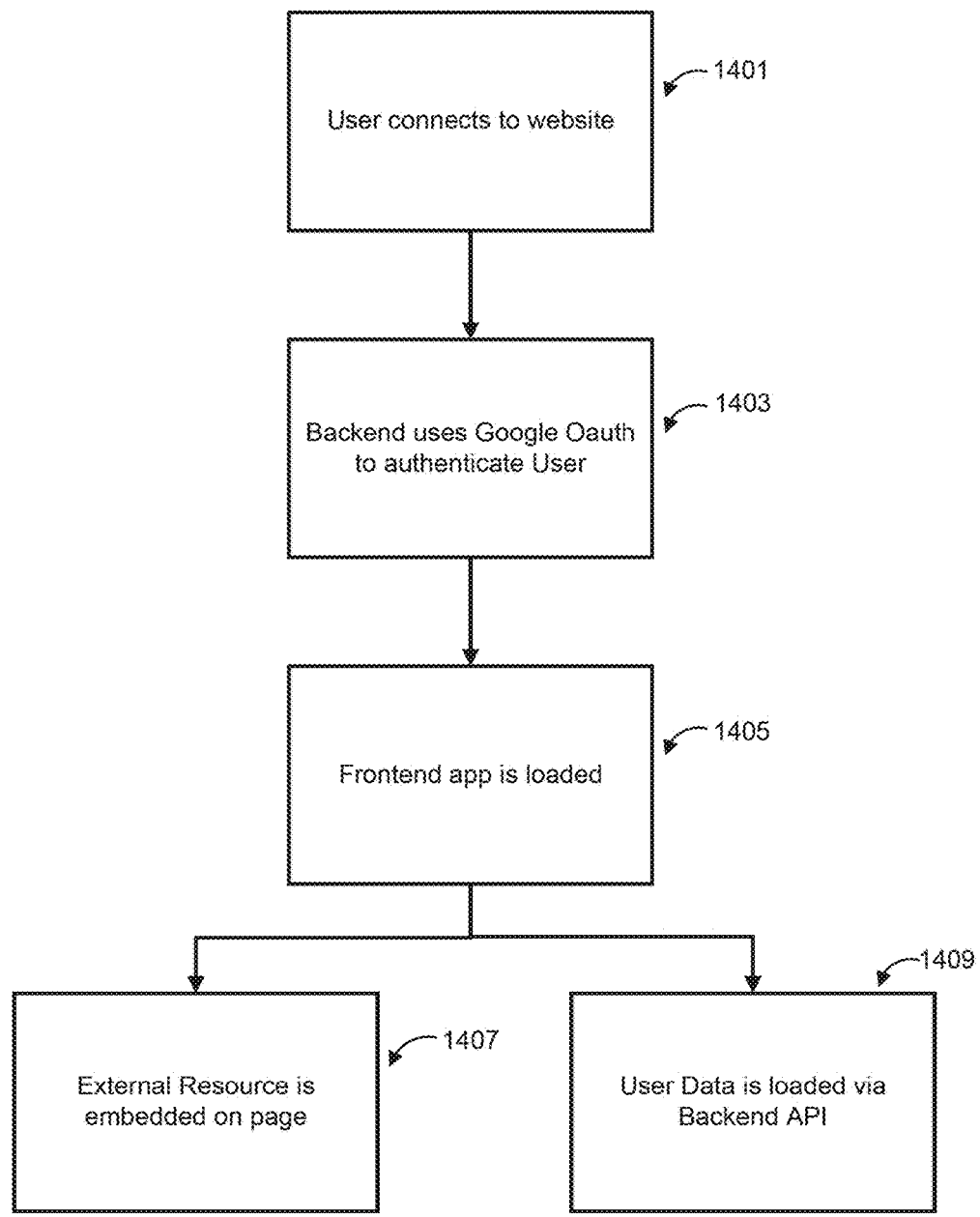
FIGS. 14-20 illustrate flow diagrams of example operations of one or more aspects of systems and methods for interactive video generation and rendering according to one embodiment of the invention.

An illustrative page load, according to an embodiment of the present invention, is illustrated in FIG. 14 below. Illustrative steps may include: (1) user connects to website at step 1401; (2) authentication of the user by the backend using Google's Oauth service at step 1403; (3) if the user is authenticated, serving the user the frontend app (such as with HTML+JavaScript, or any other suitable language) at step 1405; (4) embedding the external image resource into the page (for example, via an HTML iframe element) at step 1407; (5) providing user interaction capability with iframe content, which can be provided directly through iframe content directly, or through a user interface at step 1409; and (6) database loads and stores data from the user, also at step 1409.

Figure 15:
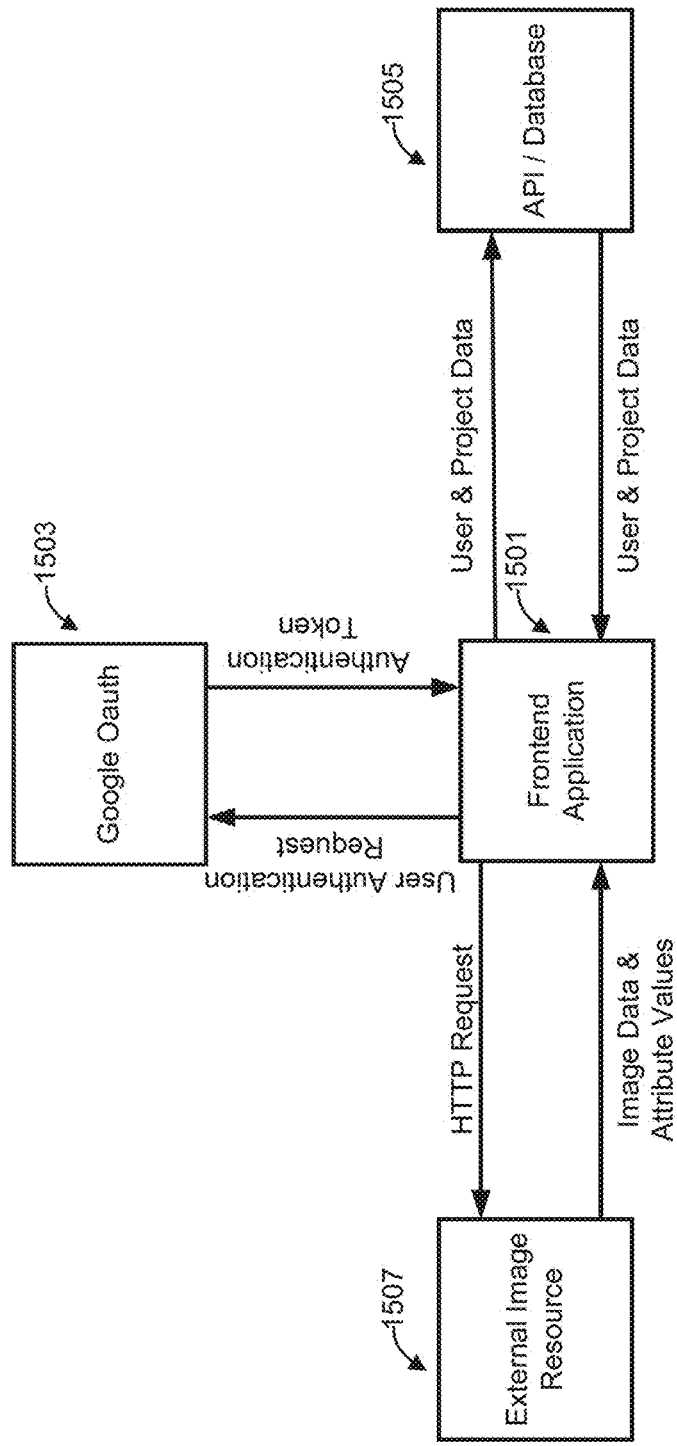

Data flow is illustrated in FIG. 15. At the center of the tool's dataflow is the frontend application 1501. As the user tries to load the frontend application, the user is authenticated with the help of the Google's Oauth service 1503.

After successfully authenticating, the user information is passed back to the frontend application 1501. The tool then sends the user information to the API 1505, which returns information about the user (e.g. settings, stored project data, etc.) back to the frontend application 1501. The frontend application is also responsible for embedding the external image resource 1507, updating it and taking screenshots of the current state of the external resource during the rendering process. As the user interacts with the frontend application 1501, the tool will store certain data temporarily in local memory and write some data permanently to the database.

Figure 16:
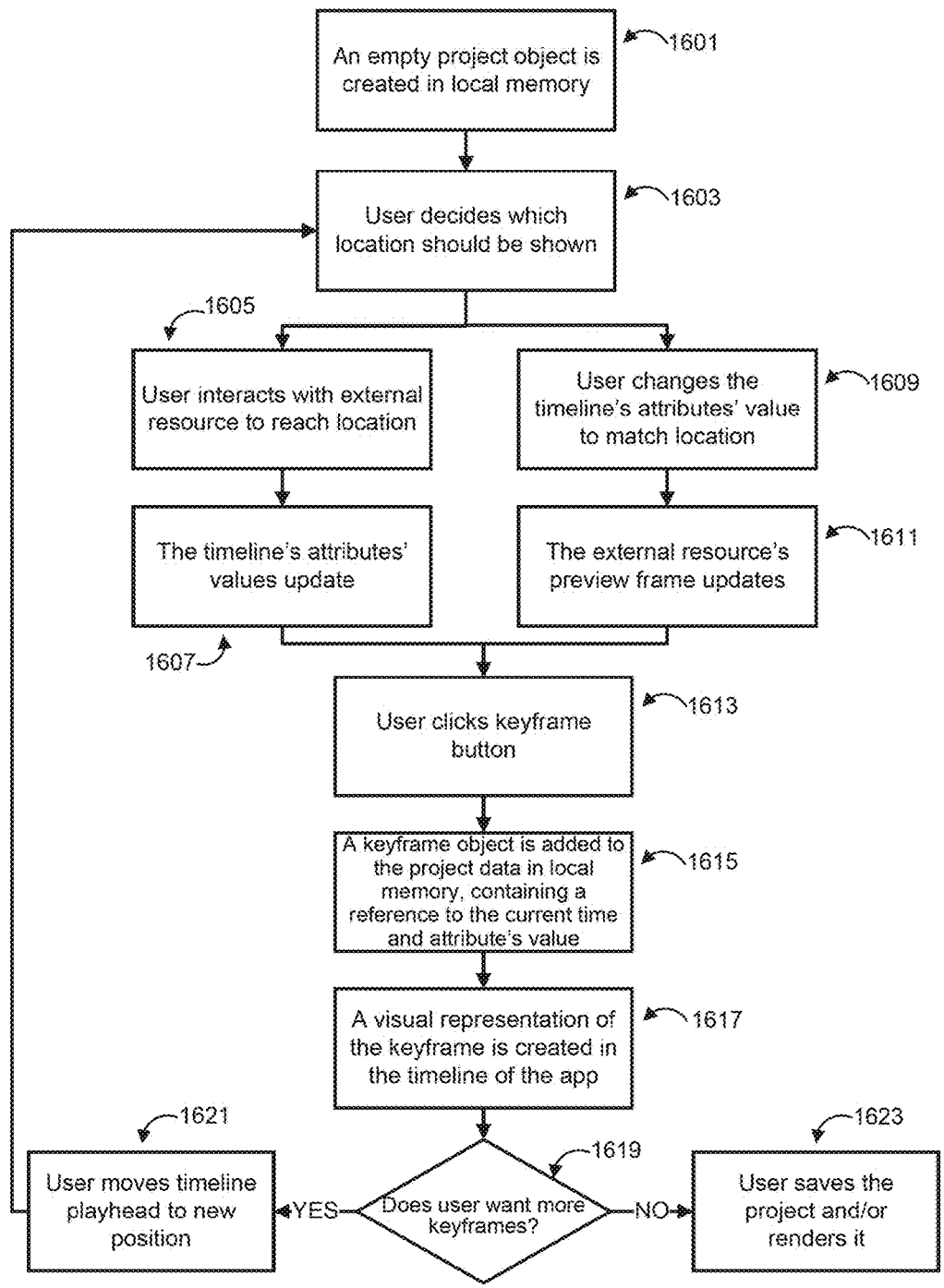

An illustrative process for initiating a new project is shown in FIG. 16. When a new, blank project is created in local memory in step 1601, the external image resource is embedded in its neutral state and no keyframes are stored in local memory yet. The user then decides which location should be shown in step 1603. After deciding, the user interacts with the tool's interface and/or the external resource to change the state of the external resource (e.g. set it to a certain location in the world). That is, the user may interact with an external resource to reach a particular location in step 1605. In step 1607, the timeline's attributes' values are updated based on the user's location selection. The user may also change the timeline's attributes' value to match a desired location in step 1609 and the external resource's preview frame then updates in step 1611. The user can then interact with the interface by, for example, clicking the keyframe button in step 1613 to create a new keyframe for certain (or all) attributes that will save the external resource's values into local memory in step 1615 so that they can be recalled for use later. After the keyframe has been created, the tool's interface will update to visually represent the keyframe (e.g. by showing the value that has been stored in graphs, etc.) in step 1617. The user then decides whether he or she wants to create more keyframes in step 1619. The user can then move the playhead to a different time position within the project and repeat the step of changing the external resource's state, creating a new keyframe to remember the values of the attributes in step 1621 and then return to step 1603. At any point, the user can choose to save the project data (which at the time only exists in local memory) to the database, in order to keep the data permanently in step 1623. The user may also choose to render the current project into an image sequence or a video and store the project that way in step 1623. Alternatively, in step 1623, the user may choose to export the project in a custom file format (*.mps, based on the JSON format) that can be re-imported into the tool to share a project with others or store a project on a local file system as opposed to a database.

Figure 17:
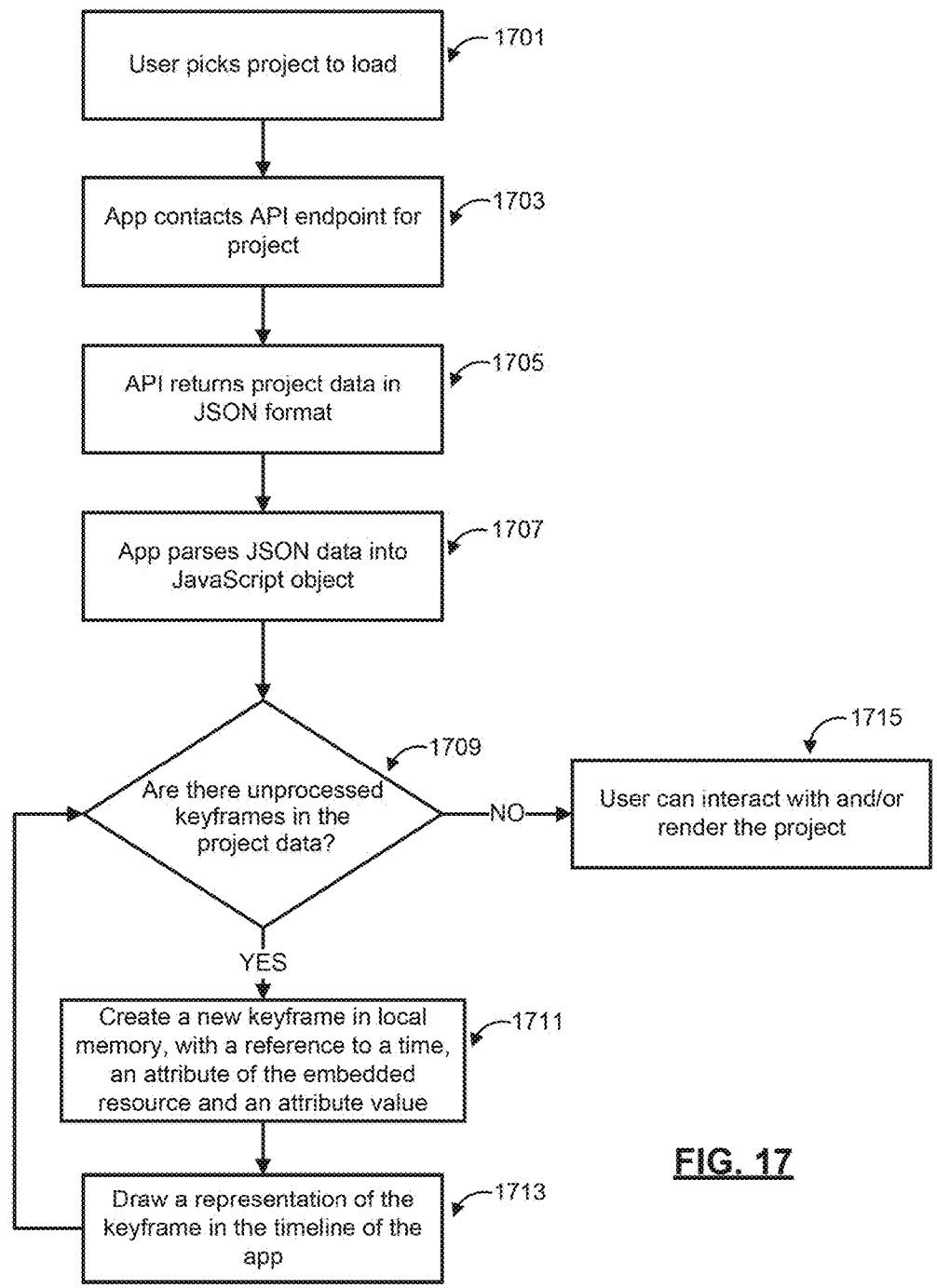

An illustrative process for loading a project is shown in FIG. 17. When the user picks a project to load into the tool's interface in step 1701, the tool sends an asynchronous HttpRequest to its API that loads the data for the project in question in step 1703. The API returns the project data in a JSON format, which contains entries for all attributes, keyframes, values, transitions and additional information about the project (e.g. project name, etc.) in step 1705. The tool then parses the JSON data to turn it into model classes that can be accessed by the application code, and stores the data in memory in step 1701. The tool's interface is then updated to reflect the newly loaded data and the user can now interact with the interface to alter the project's data. Specifically, in step 1709, the tool determines whether there are unprocessed keyframes in the project data. If there aren't, the process proceeds to step 1715, in which the tool/application is unlocked and user may interact and/or render the project (e.g., generate a video). However, if it is determined that there are unprocessed keyframes in the project data, the process proceed to step 1711, in which it creates a new keyframe in local memory, with a reference to a time, an attribute of the embedded resource and an attribute value. Then, in step 1713, a representation of the keyframe is drawn in the timeline of the application.

Figure 18:
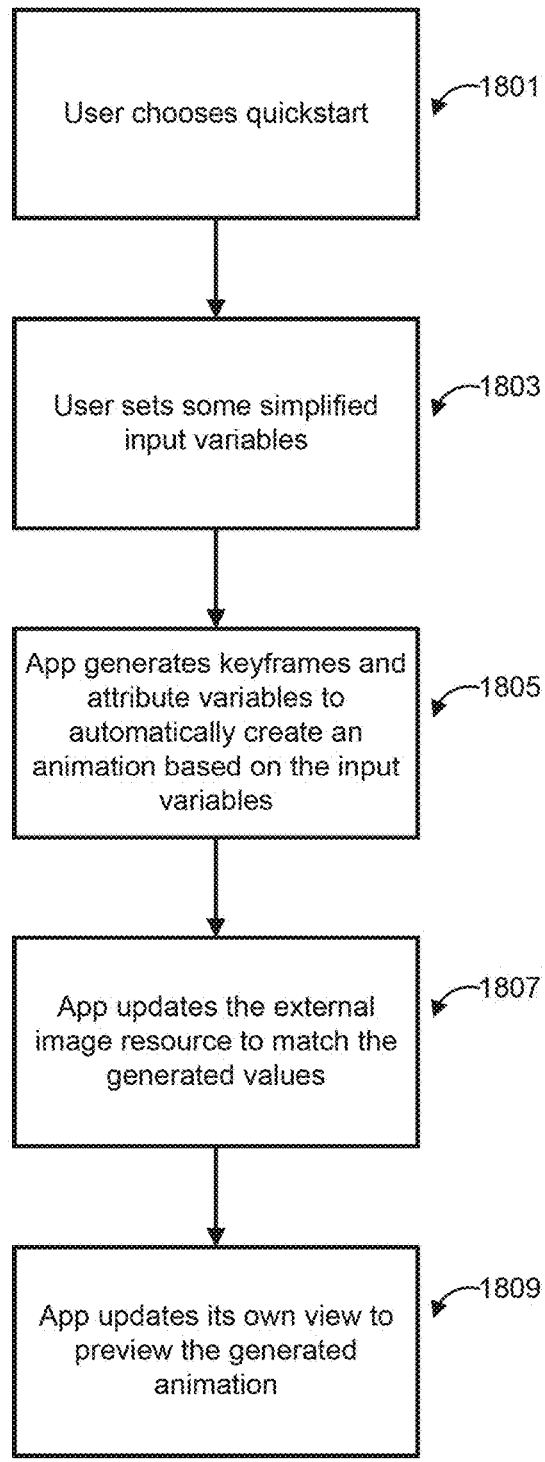

An illustrative process for a basic Quick Start workflow is shown in FIG. 18. Quick Starts are a way for the user to quickly and easily generate a complex animation based on some simple user input. The tool takes the user input and through several calculations generates the necessary keyframes and transitions to achieve the animation the user selected. The first step in the basic workflow for all Quick Starts is that the user chooses a type of Quick Start (for a specific example refer to the next paragraph) in step 1801. After picking the type of Quick Start/animation the user wants to produce, the tool then presents the user with a series of simple input interfaces to gather the necessary information it needs to generate the animation (e.g. location, duration of animation, etc.). After the user enters the necessary information in step 1803, the tool then calculates the attribute values needed to achieve the animation and creates a set of keyframes and transitions to create the camera movement the user picked in step 1805. The tool then sets both the external resource, in step 1807, and its own interface, in step 1809, to the calculated values before giving the user full control over the animation as (if the user had created it manually). For example, the user can choose to alter the generated animation or render it.

Figure 19:
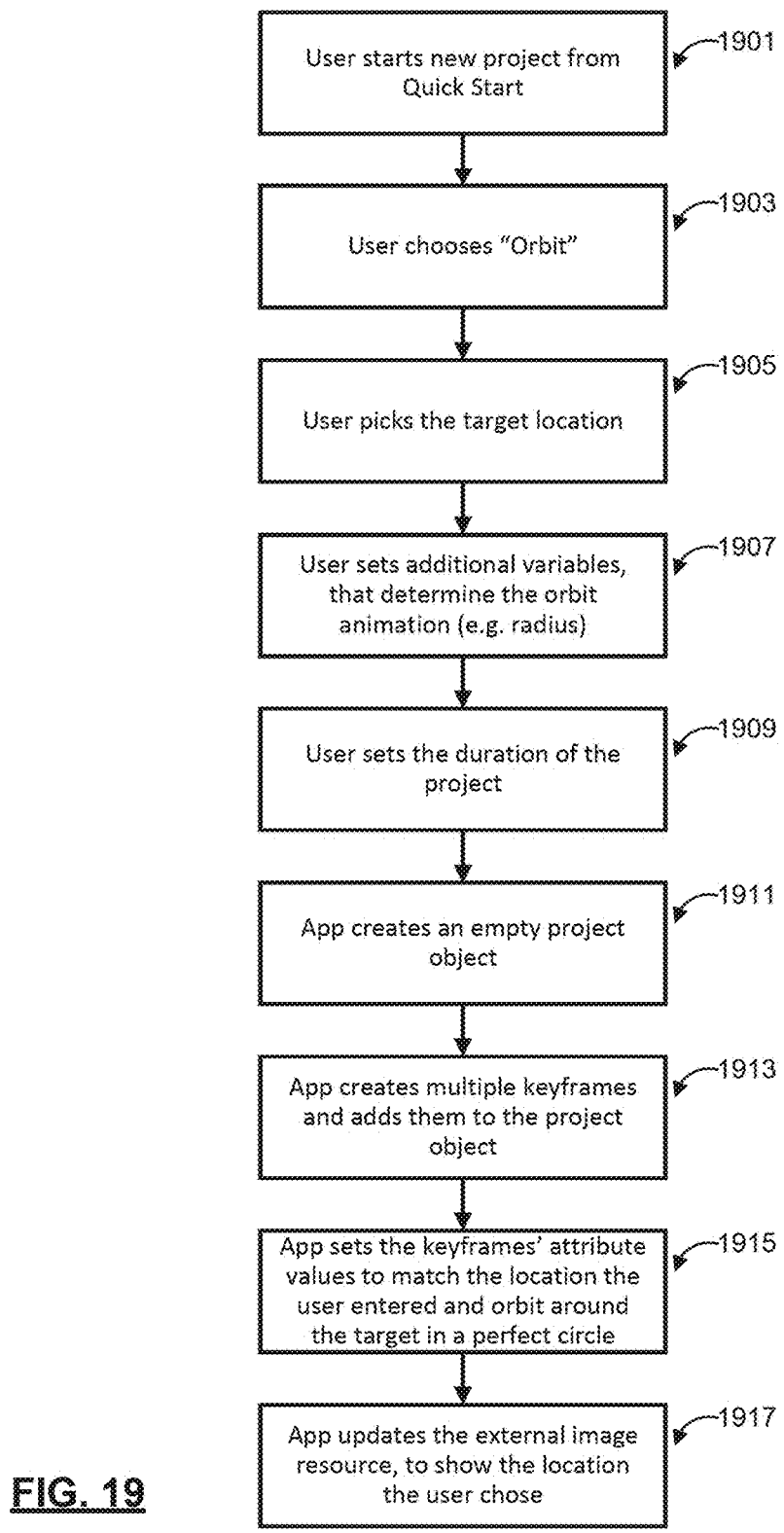

An illustrative process for Quick Start orbit is shown in FIG. 19. This example outlines the process for a specific Quick Start animation that will generate an animation as if a camera is in orbit around a location. First, the user initiates the orbit Quick Start in the tool's interface in steps 1901 and 1903. As a first input, the tool asks the user which location the camera should target around (e.g. Empire State Building in New York City) and the user chooses a location in step 1905. The tool then presents the user with several interface elements to set some additional variables that will influence the animation (e.g. which radius should be used for the orbit, which height the camera should orbit at, etc.) at step 1905. As a last step, the tool requires the user to set the duration for the animation (e.g. 25 seconds) at step 1909. The app then creates an empty project object in step 1911. In step 1913, the app creates all the necessary keyframes and transitions after the user confirms the settings and adds them to the project object. This creates an animation where the camera orbits around the location the user has picked. In the example of the orbit animation, a set of five keyframes is created for longitude, latitude and altitude to achieve a perfect circular motion around the Empire State Building in step 1915. The system/app creates a plurality of keyframes (for example, 5 keyframes) 360 divided by number of keyframes minus one (360/(5−1)=90), in this case, for example, at 90-degree offsets around the Empire State Building (e.g., creates one keyframe North of the target, one to the East, one to the South, one to West, and finally, another keyframe at the North position to form a true circle. Each keyframe is offset from the camera target by a distance equivalent to the radius of the orbit. The camera target/point of interest attribute is also set to the location of the Empire State Building so that the camera will keep pointing at the building while moving around it. The camera target attribute includes a latitude, longitude, altitude of the target and an influence value determining how much the target affects the camera's rotation values (the influence value based on a tilt value and a heading). The tool then sets the external resource to show the Empire State Building and will show the created keyframes as well as the values in its own interface, so that the user can control or tweak the animation as needed.

Figure 20:
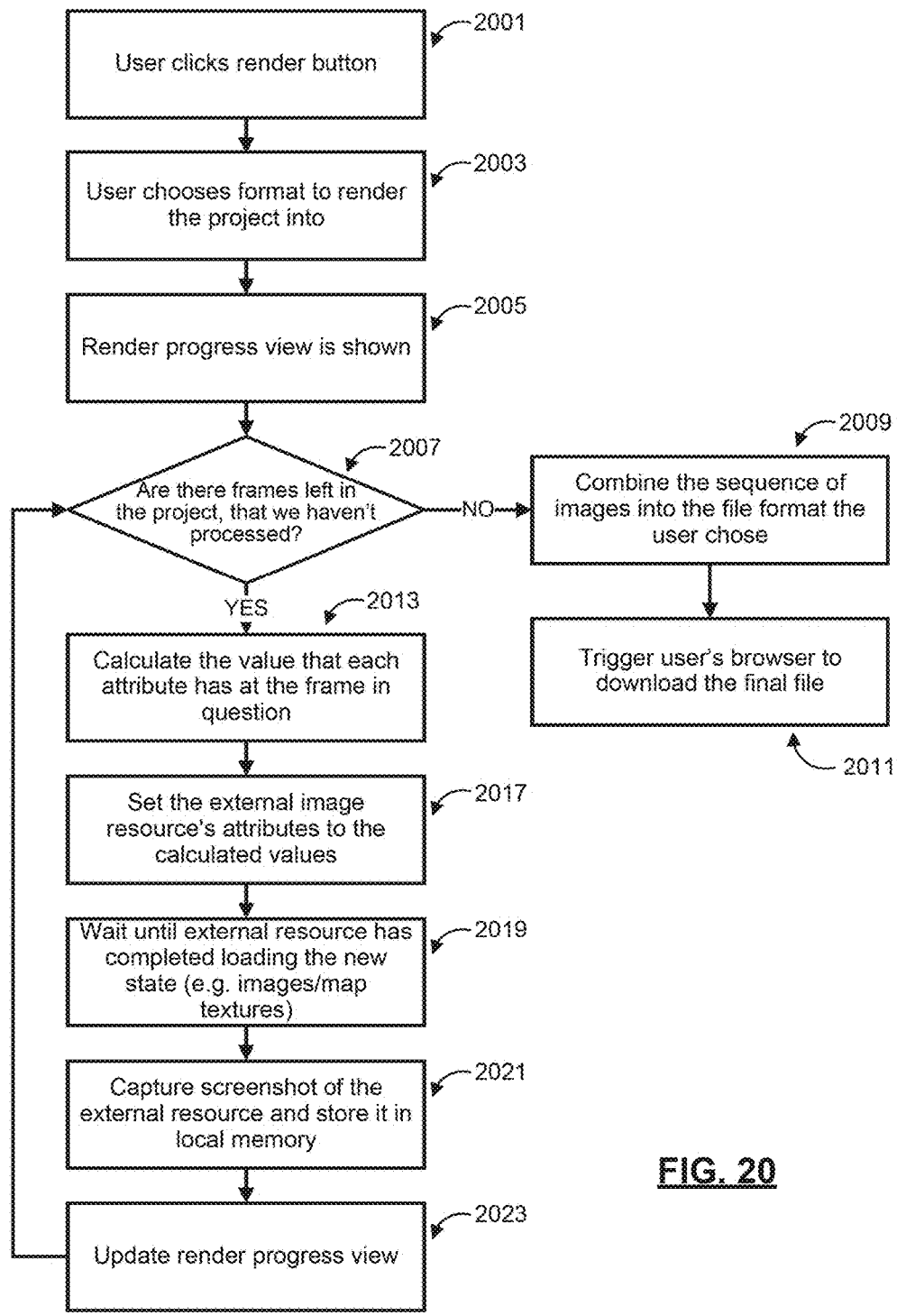

An illustrative process for render sequence is shown in FIG. 20. When a user selects the render button in the tool's graphical user interface in step 2001, a choice to select a media format is presented. The user then chooses a format to render into in step 2003. If the user chooses an image format (e.g. JPG, PNG, etc.), the tool's interface displays a view that shows a progress bar and a preview image to indicate the progress of the current rendering process in step 2005. In step 2007, it is determined whether there are frames remaining that haven't yet been processed in the project. If there are no frames remaining to be processed, the sequence of images is combined into the file format the user chose in step 2009. Then, in step 2011, the user's browser is triggered to download the animation file. However, if in step 2007, it is determined that there are frames remaining to be processed, each frame of the current project is then stepped through and the attributes' values for that particular frame are calculated in step 2013. The external resource is set to these values, and it provides the image representing the state for the provided values in step 2017. Once the external resource has finished updating to the new state in step 2019, a screenshot/image is captured and stored in memory in step 2021. The render preview that appeared in the interface earlier is updated to reflect the current process and shows the image that has just been stored in memory in step 2023. The process then returns to step 2007 and is repeated for each frame. After all frames of the project have been captured, the frames may be combined together for the user to download. For example, compressed ZIP files in step 2011.

The layout of the tool may be in any suitable format. A Graphical User Interface is utilized to display information for a user. An illustrative layout is shown in FIG. 21.

Figure 21:
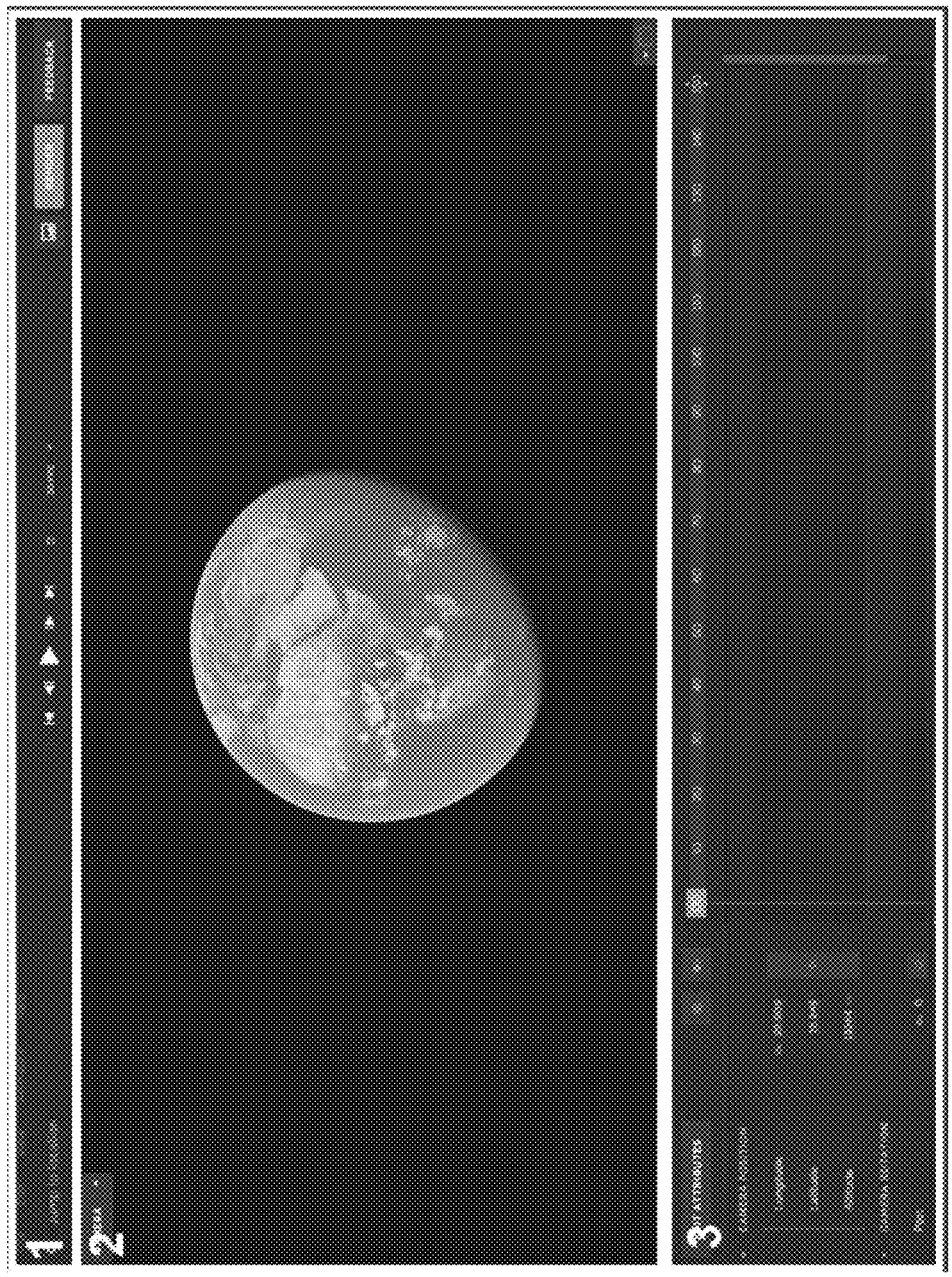
FIG. 21 illustrates a Graphical User Interface of one or more aspects of systems and methods for interactive video generation and rendering according to one embodiment of the invention.

At location "1" in FIG. 21, the tool includes a utility area. This area may be used by a user to load files, set or customize settings, select playback of the current sequence at varying speeds, and begin the rendering process.

At location "2" in FIG. 21, a preview area may display the embedded image resource using an HTML iframe element. The user may interact directly with the area to change attributes of the resource, such as the attributes discussed above. The user may also set additional attributes.

At location "3" in FIG. 21, the tool may include an attribute timeline, which shows each attribute that can be animated, with a timeline next to the attribute. A playhead is provided to mark the current position within the timeline. As the playhead progresses through the timeline, the keyframes for each attribute will cause the external resource to update.

The tool provides additional methods for changing how an attribute's value changes over time, e.g., longitude. The timing graph shows a curve that depicts the change in speed of a value over time. In the timing graph, a higher curve means that the value is changing faster compared to a curve that's closer to 0. A curve that is below 0 means the value is declining. The user may alter the value graph, which will update the timing graph and vice versa. For example, the user may alter the timing curve, which will update the value curve.

Figure 22:
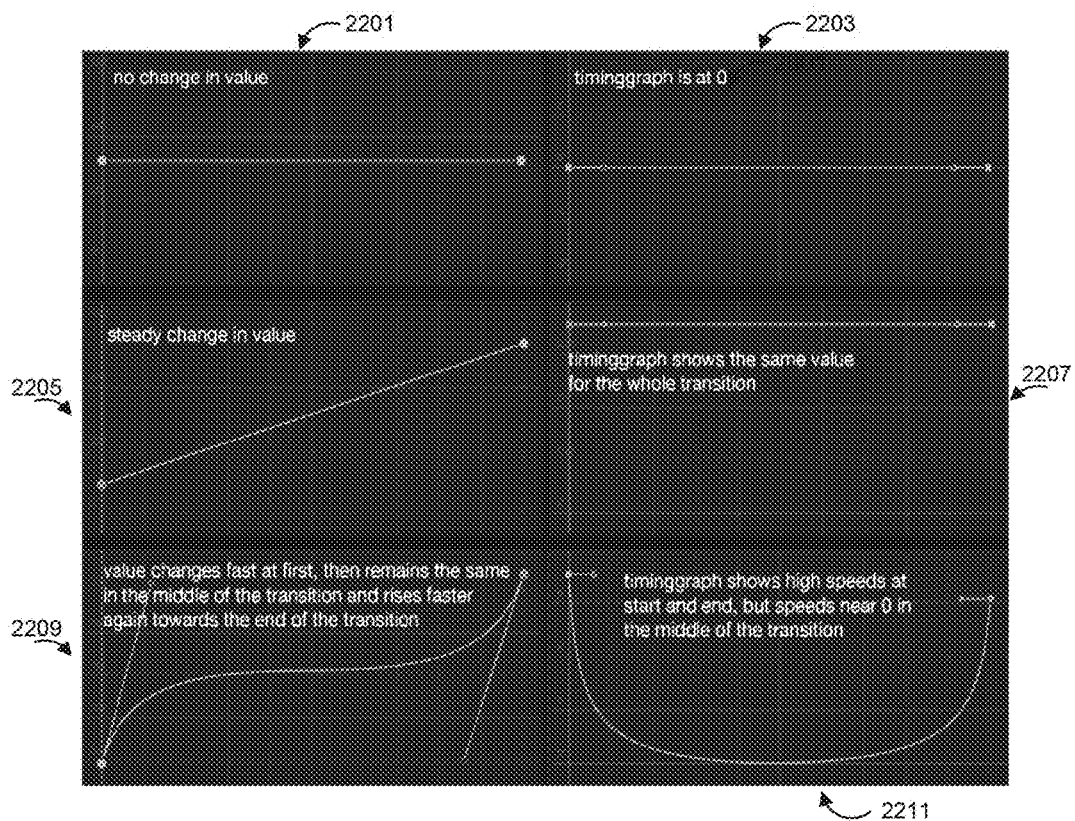
FIG. 22 illustrates a value graph of one or more aspects of systems and methods for interactive video generation and rendering according to one embodiment of the invention.

FIG. 22 shows three examples with the value graph on the left and the related timing curve on the right. In the top row on the left side 2201, there is a value graph that plots the longitude attribute. The longitude remains the same, at around 190°. On the right side is the timing graph 2203, representing the same attribute. It plots the change of the value graph over time by taking samples of the value curve and comparing the change of the value in between the samples. In the example, the timing curve of the longitude attribute would always be 0, since the value does not change in the first example (sample[n]-sample[n-1], in the example: 190-190=0). The second row shows an example of a linear transition, meaning that the value changes steadily with the same speed between the two keyframes. The value graph on the left side 2205 displays the longitude attribute that starts at around 50° and ends at around 320°. The timing graph is calculated by analyzing the value change between the different samples (sample[2]-sample[1], 50.8°-50°=0.8°) (sample[3]-sample[2], 51.6°-50.8°=0.8°). Since the value curve is rising steadily with the same speed in the example, the timing curve 2207 would stay flat at 0.8°. The last row shows an example 2209 of where the value of the longitude attribute also changes from around 50° to around 320° like in the previous example. The difference is that in this example the value does not change steadily. Instead, the value changes more in the beginning and then remains almost the same for some time before it starts changing again near the second keyframe. The timing graph 2211 accurately reflects this with a high curve in the beginning and at the end, indicating that the value changes with high speed, whereas the curve at around 0 in the middle shows that the value remains more or less the same. Example calculations for this curve would be (beginning: sample[2]-sample[1], 57°-50°=7°) (middle: sample[150]-sample[149], 190°-190°=0°) (end: sample[300]-sample[299], 320°-314°=6°).

That is, to allow a user to render an image sequence, once the user selects rendering, each frame of the current project is stepped through and the attributes' values are calculated. The external resource then sets to these attributes (values), and images are provided. Once the external resource has finished updating to the new state, a screenshot is captured, and the process is repeated for each frame. Images are therefore requested from the external resource. When all frames are captured, the frames may be combined together into, for example, a compressed file (e.g., a .zip file), a plurality of images, or a video file (such as MP4) that can be downloaded.

Figure 23:
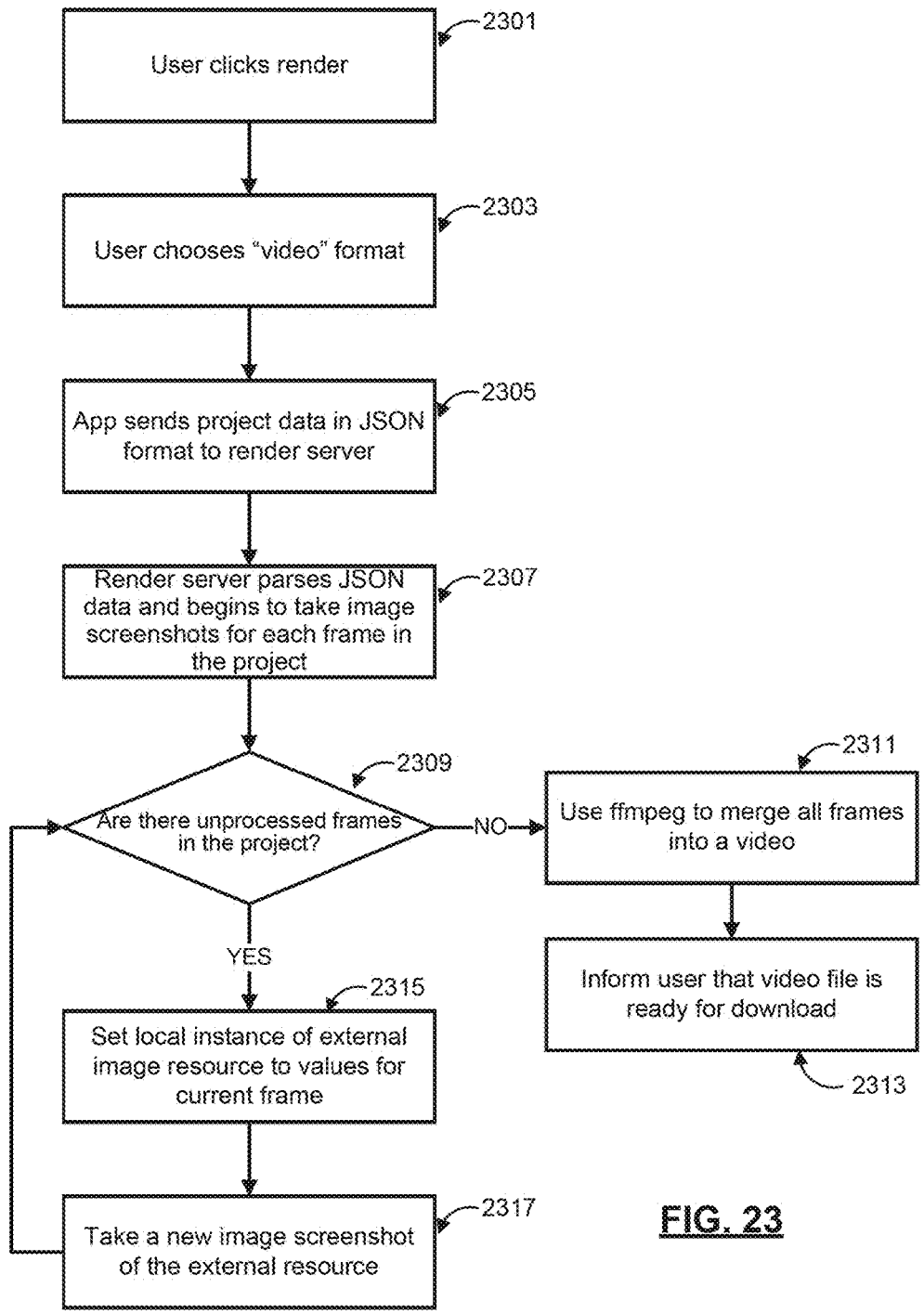
FIG. 23 illustrates a flow diagram of example operations of one or more aspects of systems and methods for interactive video generation and rendering according to one embodiment of the invention.

An illustrative process for video rendering is described below with reference to FIG. 23. The user selects the render button in the interface in step 2301. The user can then choose from different media formats to render the project into. After selecting a video format in step 2303, the tool sends the data of the current project to a remote server(s) 107-109, and/or 113 that will handle the rendering process in step 2305. Specifically, in step 2305, the tool sends project data in JSON format to a render server. The render server is a server dedicated to exclusively to rendering video files. That server is running its own instance of the tool that loads the project data that has been sent to the server (i.e., the render server instantiates the same object). The server then renders out an image sequence of the project following the steps as described in the immediately preceding paragraph and/or FIG. 22 and its description. More specifically, in step 2309, it is determined whether there are unprocessed frames in the project. After the image sequence has been completed, in step 2311, the open source multimedia framework ffmpeg (https://www.ffmpeg.org/) is used to create a video out of the image sequence. The server will store the video file in a way that the user can download it and will notify the user's tool that the download is ready in step 2313. The user's interface will display the download link from which the user can download the created file.

However, if there are unprocessed frames in the project, the process proceeds to step 2315, which sets a local instance of external image resource to values for the current frame. Then, in step 2317, a new image screenshot is taken of the external resource. The process then returns to step 2309.

Figure 24:
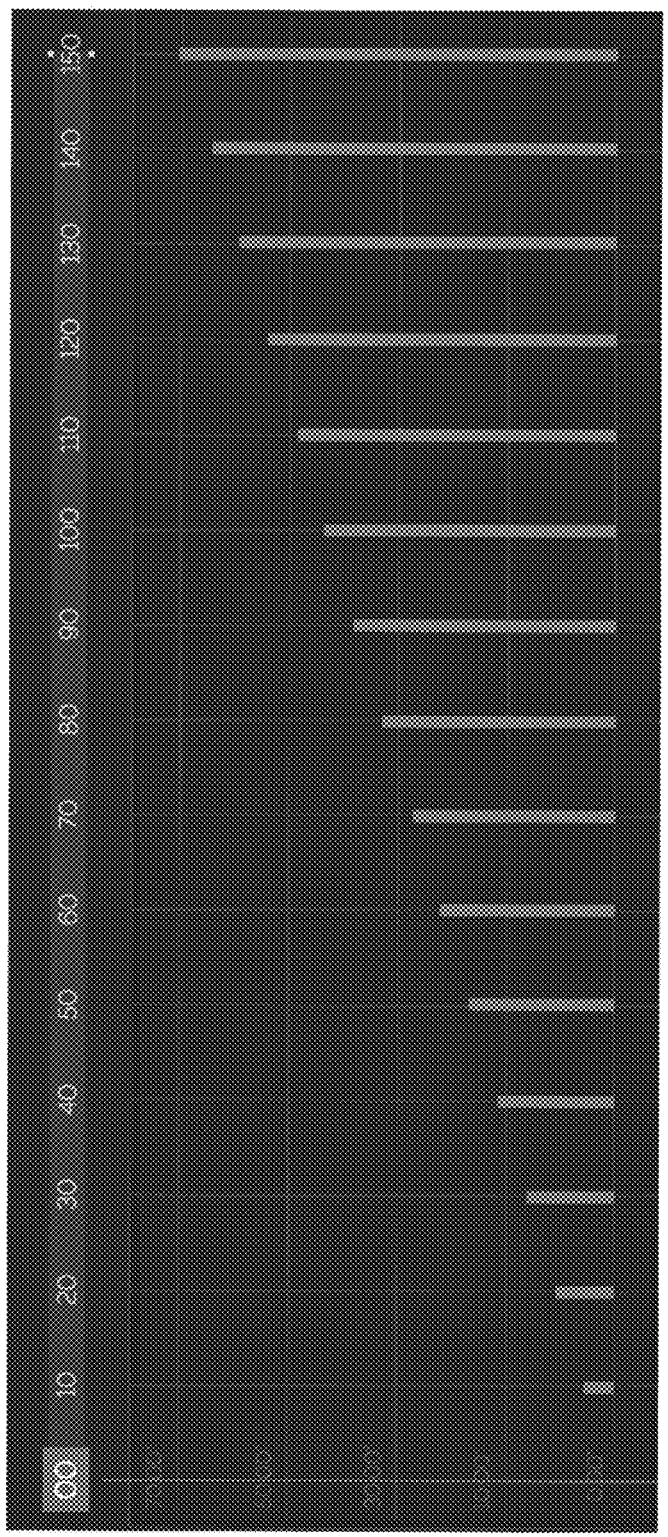
FIGS. 24-32 illustrates a Graphical User Interface of one or more aspects of systems and methods for interactive video generation and rendering according to one embodiment of the invention.

In accordance with an embodiment of the invention, the tool may provide multiple views for displaying an external image resource based on current user input. Thus, the tool may offer a range of different methods to display the past, current and future states of the external image resource based on the current user input. For example, to display the state of an attribute over time, incorporating past and future states of the attribute, a bar chart graph may be utilized. Rectangular bars are rendered and shown, with lengths proportional to the attribute's values on one dimension or axis (e.g., the X-axis), and one or more bars displayed along a second dimension or axis (e.g., the Y-axis) to represent the position in time of the particular value. This feature is illustrated in FIG. 24.

The tool may implement a variety of graph views, each with a different purpose or focus. For example, the "keyframe view" shown in FIG. 25 displays keyframes of different attributes, highlighting where in time the keyframes exist.

Figure 25:
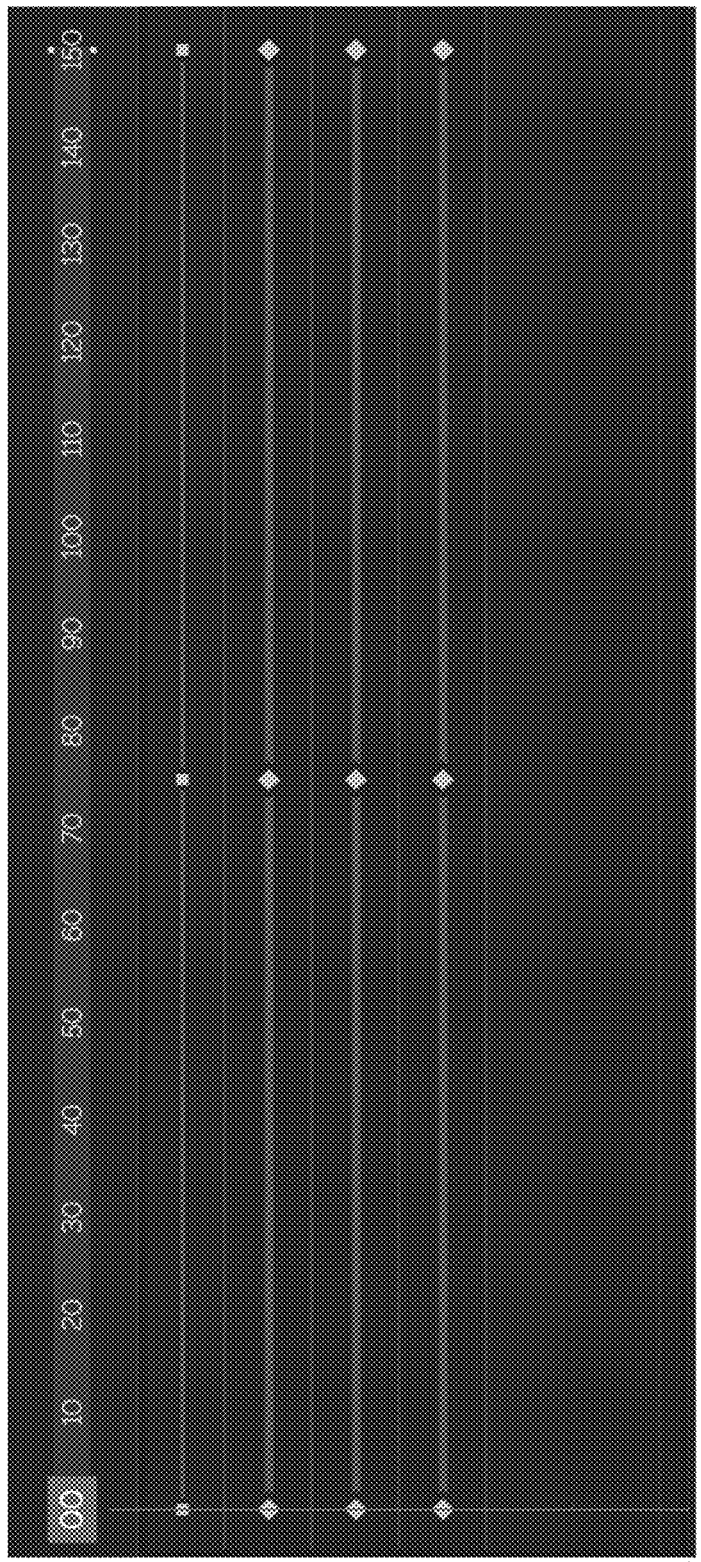
Figure 26:
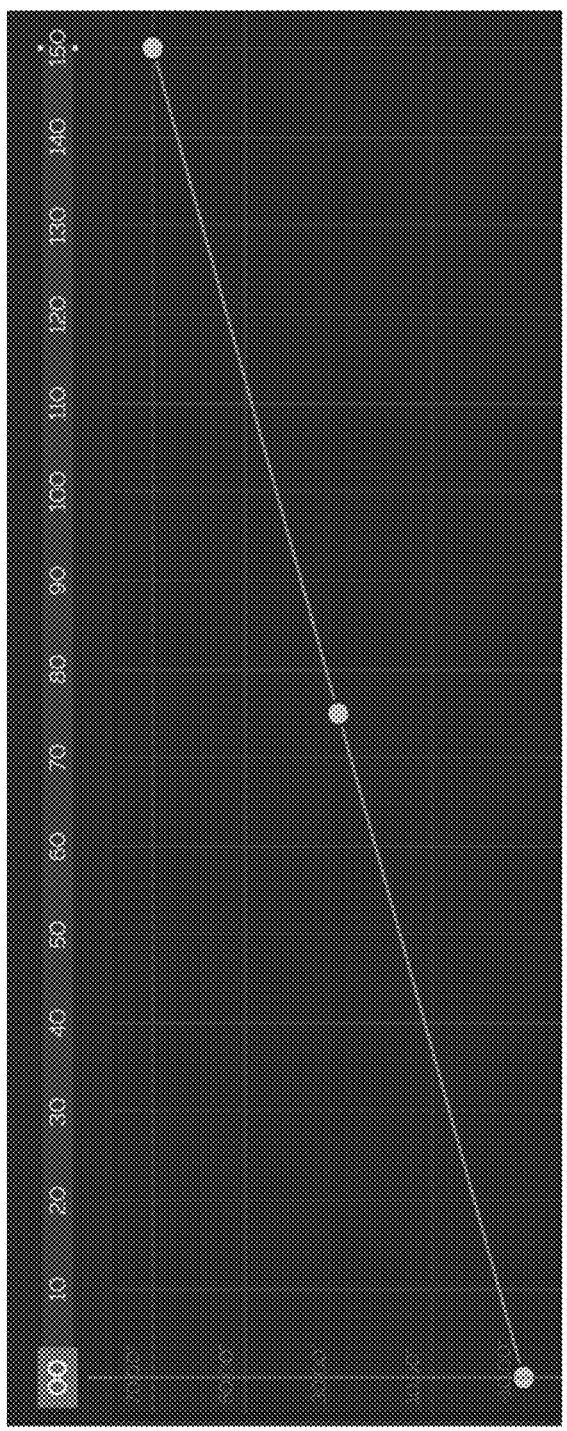

On the other hand the "value graph," shown in FIG. 26, displays the same keyframes as those in FIG. 25, with additional information illustrating the value changes. Specifically, FIG. 26 illustrates how an attribute may move in between different keyframes over a span of time.

Figure 27:
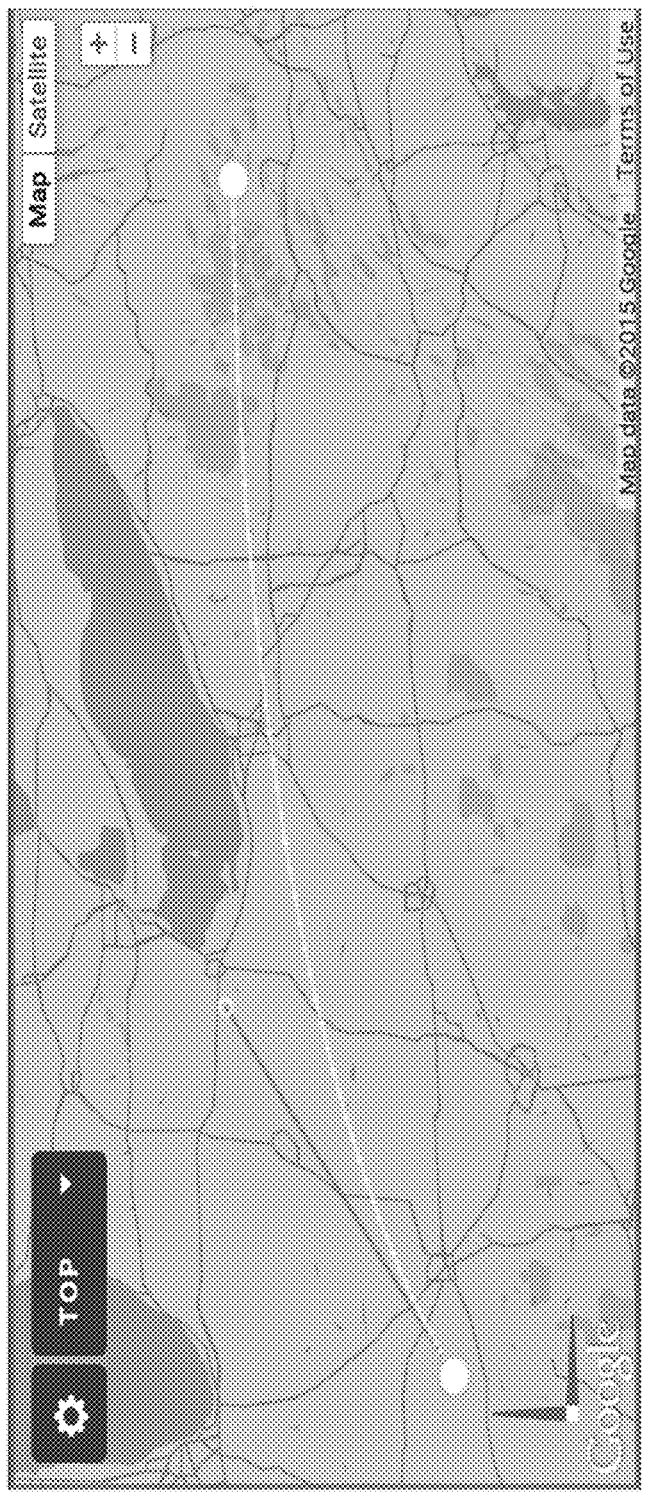

The tool may also utilize one or more graph views, which display a combination of two or more attributes in one graph. Using a 2-Dimensional map view, the tool may plot the changes of longitude and latitude into one comprehensible path graphic. This path graphic, as illustrated in FIG. 27, may be a camera path graphic.

Figure 28:
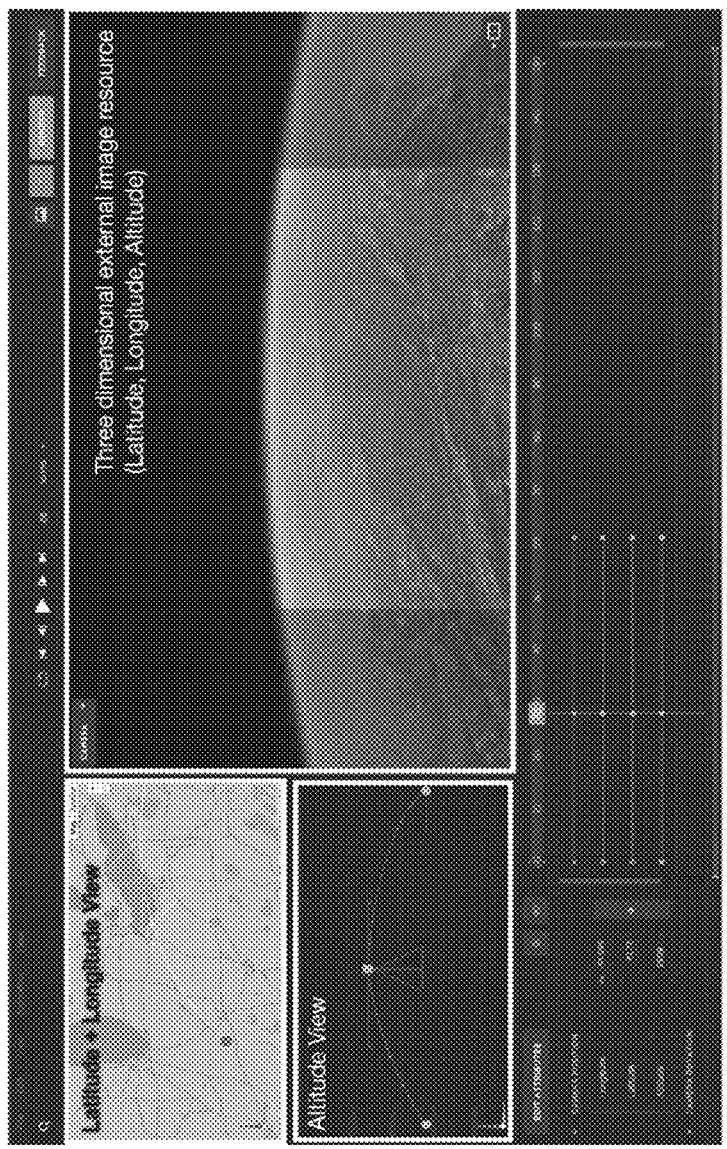

The tool may also utilize a combination of multiple views to simplify the display of a more complex dataset. For example, one of such combinations of multiple views may include a 2D map view and an altitude value graph which, when displayed together, allow the user to read and interpret the complex 3D movement of a camera using two simpler 2D graphs. This is illustrated in FIG. 28.

The tool therefore allows the user to combine multiple views, and arranges the views in a flexible grid based on the number of views desired. The user can resize the views inside the grid and switch between each type of view at any time.

Figure 29:
Figure 30:
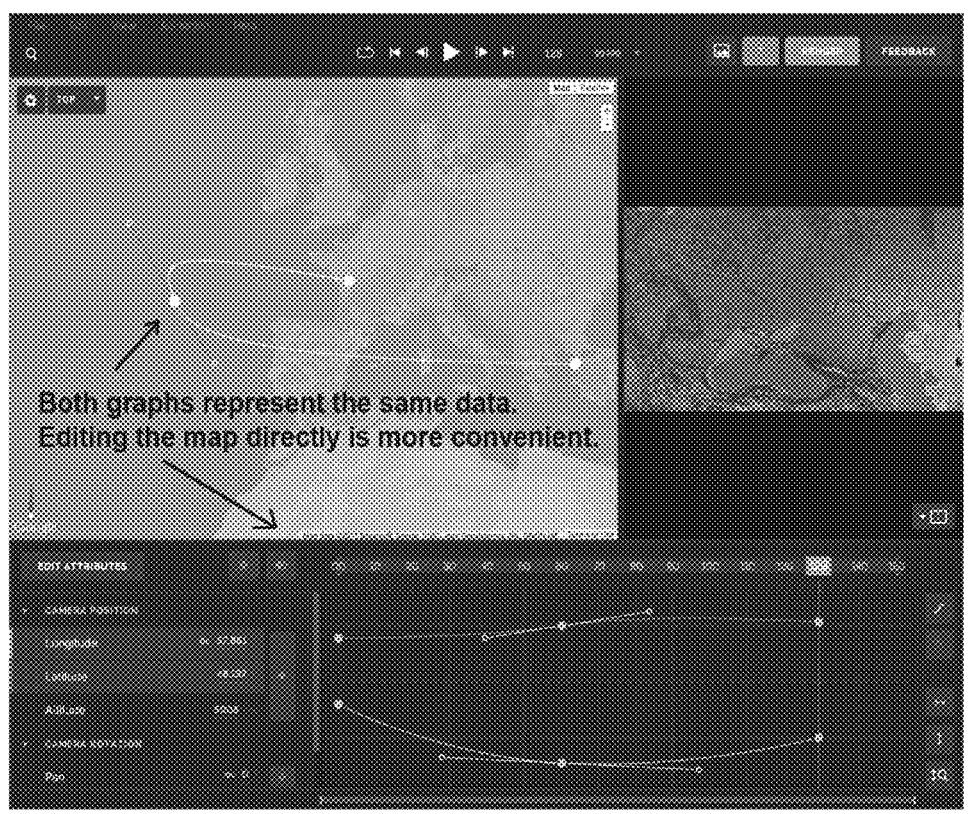
Figure 31:
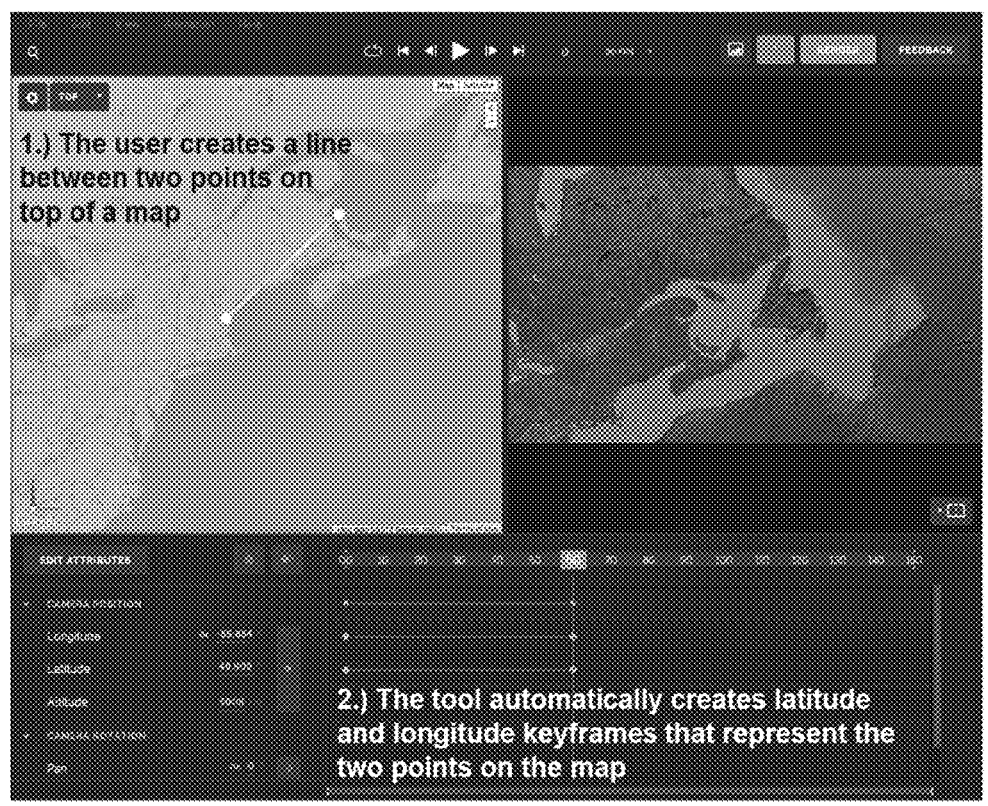

The tool may also provide a feature known as Direct-path Editor. Using multiple views displayed in combination, a user can directly edit the three-dimensional camera movement of an animation. The following graphs display multiple attributes at the same time, which allows the user to set values for multiple attributes with one interaction. For example, creating a line on top of a 2D map view, as shown below in FIG. 29, will set the values for longitude and latitude at the same time, as displayed below in FIG. 30. Therefore, directly editing paths in the multi-view simplifies the user's workflow by reducing the amount of user interactions needed to achieve a complex camera move, as can be seen in FIG. 31.

The tool may incorporate a 3D camera export feature. If the embedded external image resource utilizes three-dimensional coordinates as part of its attributes (e.g. latitude, longitude, altitude or x, y, z). This data can be used in other third-party applications. For example, 3D camera data may be exported from the tool into a .JSX file format, for the purposes of then importing the data into any suitable compositing software, such as Adobe After Effects—see the source code below for such export and example of a data structure. The file contains references to 3D positions for each frame of the project that the user has created in the tool. The user may then import a rendered image sequence of the project, and use the camera data for further advanced compositing techniques. The exported 3D camera data may allow the user to place and then import a rendered image sequence of the project, and use the camera data for further advanced compositing techniques. The exported 3D camera data may allow the user to place objects (e.g. text) on top of the rendered image sequence, for example, and move these objects relative to the camera view of the image sequence, making them appear to be part of the original scene.

The tool may provide for a playback Application Program Interface (API), which allows users to embed projects into external websites. A special version of the tool's source code may therefore be made accessible to users. This code may not contain any of the interface nor editing capabilities. Limited functionality is provided, and it is only for playback of project data. The playback version embeds the external image resource, loads the user's project data and then plays back the animation by setting the external resource's attributes in real-time. This method allows for a smaller file size compared to a rendered image sequence or video file. It also allows the user to change the project data, as well as the animation's playback behavior, in real-time. Controls such as playback control (pausing and resuming playback) to more advanced control over the animation, such as dynamically changing values used in the animation, may be provided. The user can prepare the project for such dynamic interaction during the creation of a project in the tool's interface.

Figure 32:

For example, a user may flag a keyframe in the project's timeline as a "wait" keyframe. Once the playback version of the tool reaches this keyframe, the playback will pause, and will only resume after a predetermined user interaction (e.g. clicking a link on the website, scrolling, touch events such as tapping and pinching, etc.) or a predetermined time (e.g., 0.5 seconds). In another example, a user may add a "track point" to the project in the tool's interface. A track point is a point that the user can position and animate on top of the external image resource in the tool's interface. This point will not be visible when rendering the project. The track point will, instead, be accessible in the project data so that the point's position can be accessed later, and then be used programmatically to place elements in its place as illustrated in FIG. 32. The user will be given the possibility to access the embedded playback version of the tool programmatically through an API. Coupled with the dynamic interaction the user has made to control playback, objects may be added on top of the external resource.

The tool may expose some of the editor's interface and code through an API. The API may provide for developers to create plugins for the tool that expand both the functionality and capability of the tool. Such plugins may include visual interface additions (e.g., graph views that display the project data in different ways), data processing (e.g., ability to export project data in a special format, additional attributes that can be animated) or additional interactions to be made accessible in the playback API.

The tool may provide for Keyhole Markup Language (KML) support. KML is an XML notation for expressing geographic annotation and visualization within Internet-based, 2D maps and 3D Earth browsers. The tool may import KML files and process their information. This can be used to create keyframes and set values for attributes (e.g., setting latitude, longitude and altitude based on KML information) or add additional information to the project that would otherwise not be available in the external image resource. For example, KML files might contain geographical border data that can then be displayed and rendered on top of the external image resource. Another example would be a KML file containing text labels for certain locations that can be placed in the scene by our tool.

The tool may provide for the definition of foreign attributes. For example, in addition to the predefined list of attributes that exist in the external resource, which may be influenced by the tool through a one-to-one relationship (e.g. the latitude attribute in the tool influences the attribute of the same name in the external resource), additional attributes unique to the tool may be defined. These unique attributes are foreign references, which do not have a direct equivalent attribute on the external resource, and instead may form one-to-one or one-to-many relationships with any other attribute of the external image resource. After the user interacts with the tool and sets a value to the foreign attribute, the tool may then translate this value into values for one or multiple attributes that exists in the external resource.

One example of a foreign attribute that forms a one-to-one relationship with an attribute of the external resource may include a "time of day" attribute. This attribute may be defined in the tool, but would not exist in the external image resource (which in this example is a 3D model of the earth). If the user interacts with the foreign "time of day" attribute and sets a value, the tool will then calculate how the related attribute of the external resource will be affected by the user's change. Setting the time of day influences the attribute "position of the sun" for the external resource. As the user changes the time of the day, the tool calculates the correct position of the sun on the earth's horizon and makes the necessary update to the other attribute on the external resource.

Another example of a foreign attribute with a one-to-many relationship is "point of interest." The user may define any location as a "point of interest." The tool will then calculate values for multiple other attributes on the external image resource based on this one input (e.g. latitude, longitude, altitude, camera tilt, camera rotation), in order to show the user defined point of interest in the external resource.

While certain illustrative embodiments are described herein, it should be understood that those embodiments are presented by way of example only, and not limitation. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

What is claimed is:

1. A method for animating a map resource, the method comprising:
   receiving, by one or more computing devices, a plurality of Uniform Resource Locators (URLs) from a third party website, the plurality of URLs comprising one or more attributes;
   displaying by the one or more computing devices, one or more images corresponding to the one or more attributes from the third party website,
   receiving, by the one or more computing devices, a user selection of the one or more images to create an animation sequence of one or more of the attributes;
   querying, by the one or more computing devices, a current value of the one or more attributes from an external resource and returning the queried value;
   receiving, by the one or more computing devices, a first keyframe and a second keyframe for the animation sequence;
   interpolating, by the one or more computing devices, one or more additional keyframes with assigned values;
   creating, by the one or more computing devices, the animation sequence based on the first keyframe, the second keyframe, and the one or more addition keyframes; and
   displaying, by the one or more computing devices, the animation sequence to a user.

2. The method of, claim 1, wherein the attributes, comprise one or more of latitude, longitude, altitude, zoom level, and pan.

3. A system for interactive video generation and rendering, the system comprising:
   a client device, in communication with a server, the client device configured to:
      display one or more images from a third party website;
      receive an input from a riser indicating a user selection of the one or more images to create an animation sequence;
      receive an input from the user indicating a user selection of a first keyframe in the animation sequence and a second keyframe in the animation sequence, the first keyframe comprising a first plurality of keyframe attributes, the second keyframe comprising a second plurality of keyframe attributes;
      transmit, via a network, the first keyframe and the second keyframe to the server;
      display, on a display screen, the animation sequence received from the server, the animation sequence comprising a first image corresponding to the first keyframe, a second image corresponding to the second keyframe, and a third image corresponding to a third keyframe, the first image, the second image, and the third image received, by the client device, via a network, from the server;
   the server, in communication with the client device, the server configured to:
      receive, via the network, the first keyframe and the second keyframe from the client device;
      interpolate a third keyframe based on the first plurality of keyframe attributes of the first keyframe and the second plurality of keyframe attributes of the second keyframe, the third keyframe comprising a third plurality of keyframe attributes;
      determining and retrieving the first image based on the first plurality of keyframe attributes from a memory, determining and retrieving the second image based on the second plurality of keyframe attributes from the memory, and determining and retrieving the third image based on the third plurality of keyframe attributes from the, memory;
      generating the animation sequence based on the first image, the second image, and the third image;
      transmitting, via a network, the animation sequence to the client device.

4. The system of claim 3, the interpolating of a value of a first keyframe attribute of the third keyframe at time t based on the equation: $B(t)=(1-t)^3 P_0 +3(1-t)^2 tP_1 +3(1-t)t^2 P_2 +t^3 P_3$, $t \in [0,1]$, where t is time, $P_0$ is a first keyframe, $P_1$ is a transition point out of $P_0$, P is a transition point into P, and P is a second key frame.

5. The system of claim 3, wherein a first keyframe attribute of the third keyframe is interpolated by determining a difference in time between the first keyframe and the third keyframe, and a difference in time between the second keyframe and the third keyframe.

6. The system of claim 3, wherein retrieving; the first image comprises the server transmitting to a second server a string including at least, one of the first keyframe attributes.

7. The system of claim 3, wherein retrieving the first image comprises transmitting, by the server, to a render server, at least one of the first keyframe attributes, wherein the render server is a server dedicated to exclusively rendering video files.

8. The system of claim 7, wherein the transmitting, by the server, to the render server comprises accessing, by the server, a Uniform Resource Locator (URL) on the render server, the URL comprising a string comprising at least one of the first keyframe attributes, wherein the render server is a server dedicated to exclusively rendering video files.

9. The system of claim 8, the string further comprising a second of the first keyframe attributes and a separator character, the separator character located at an index larger than the last character of the at least one of the first keyframe attributes and smaller than an index of a first character of the second of the first keyframe attributes.

10. The system of claim 8, wherein the render server instantiates an instance of an object, and the server instantiates a different instance of the object.

11. The system of claim 7, wherein the render server parses the first keyframe attributes, the first keyframe attributes stored in JSON data received by the render server from the server, accesses a temporary image from a render server memory based on the first keyframe attributes, takes a screenshot of the temporary image and store the first image, pixels of the first image being equivalent to pixels of the screenshot of the temporary image.

12. A method for interactive video generation and rendering, the method comprising:
   displaying, by a client device, one or more images from a third party website;
   receiving, by a client device, an input from a user indicating a user selection of the one or more images to create an animation sequence;
   receiving, by a client device, an input from the user indicating a user selection of a first keyframe in the animation sequence and a second keyframe in the animation sequence, the first keyframe comprising a first plurality of keyframe attributes, the second keyframe comprising a second plurality of keyframe attributes;
   transmitting, via a network by the client device, the first keyframe and the second keyframe to the server;
   displaying, by the client device, on a display screen, the animation sequence received from the server, the animation sequence comprising a first image corresponding to the first keyframe, a second image corresponding to the second keyframe, and a third image corresponding to a third keyframe, the first image, the second image, and the third image received, by the client device, via a network, from the server;
   receiving, via a network by a server, the first keyframe and the second keyframe from the client device;
   interpolating, by the server, a third keyframe based on the first plurality of keyframe attributes of the first keyframe and the second plurality of keyframe attributes of the second keyframe, the third keyframe comprising a third plurality of keyframe attributes;
   determining, by the server, and retrieving the first image based on the first plurality of keyframe attributes from a memory, determining and retrieving the second image based on the second plurality of keyframe attributes from the memory, and determining and retrieving the third image based on the third plurality of keyframe attributes from the memory;
   generating, by the server, the animation sequence based on the first image, the second image, and the third image;
   transmitting, by the server via a network, the animation sequence to the client device.

13. The system of claim 12, the interpolating of a value of a first keyframe attribute of the third keyframe at time t based on the equation: $B(t)=(1-t)^3 P_0 +3(1-t)^2 tP_1 +3(1-t)t^2 P_2 +t^3 P_3$, $t \in [0,1]$, where t is time, $P_0$ is a first keyframe, $P_1$ is a transition point out of $P_0$, P is a transition point into P, and P is a second key frame.

14. The system of claim 12, wherein a first keyframe attribute of the third keyframe is interpolated by determining a difference in time between the first keyframe and the third keyframe, and a difference in time between the second keyframe and the third keyframe.

15. The system of claim 12, wherein retrieving the first image comprises the server transmitting to a second server a string including at least one of the first keyframe attributes.

16. The system of claim 15, wherein the render server parses the first keyframe attributes, the first keyframe attributes stored in JSON data received by the render server from the server, accesses a temporary image from a render server memory based on the first keyframe attributes, takes a screenshot of the temporary image and store the first image, pixels of the first image being equivalent to pixels of the screenshot of the temporary image.

17. The system of claim 12, wherein the transmitting, by the server, to the render server comprises accessing, by the server, a Uniform Resource Locator (URL) on the render server, the URL comprising a string comprising at least one of the first keyframe attributes, wherein the render server is a server dedicated to exclusively rendering video files.

18. The system of claim 17, the string further comprising a second of the first keyframe attributes and a separator character, the separator character located at an index larger than the last character of the at least one of the first keyframe attributes and smaller than an index of a first character of the second of the first keyframe attributes.

19. The system of claim 17, wherein the render server instantiates an instance of an object, and the server instantiates a different instance of the object.

* * * * *